US006741340B2

(12) United States Patent
Murakawa et al.

(10) Patent No.: US 6,741,340 B2
(45) Date of Patent: May 25, 2004

(54) OPTICAL AXIS ADJUSTMENT METHOD, AND STORAGE MEDIUM RECORDED WITH A PROGRAM THAT EXECUTES SAID ADJUSTMENT METHOD

(75) Inventors: Masahiro Murakawa, c/o Electrotechnical Laboratory, Agency of Industrial Science & Technology, 1-4, Umezone 1-chome, Tsukuba-shi, Ibaraki (JP); Tetsuya Higuchi, c/o Electrotechnical Laboratory, Agency of Industrial Science & Technology, 1-4, Umezono 1-chome, Tsukuba-shi, Ibaraki (JP)

(73) Assignees: Agency of Industrial Science & Technology Ministry of International Trade & Industry, Tokyo (JP); Masahiro Murakawa, Tsukuba (JP); Tetsuya Higuchi, Tsukuba (JP)

( * ) Notice: Subject to any disclaimer, the term of this patent is extended or adjusted under 35 U.S.C. 154(b) by 488 days.

(21) Appl. No.: 09/749,903

(22) Filed: Dec. 29, 2000

(65) Prior Publication Data

US 2002/0101581 A1 Aug. 1, 2002

(30) Foreign Application Priority Data

Oct. 18, 2000 (JP) ........................................ 2000-318278

(51) Int. Cl.$^7$ ................................................. G01C 1/00
(52) U.S. Cl. ....................................................... 356/138
(58) Field of Search .......................................... 356/138

(56) References Cited

U.S. PATENT DOCUMENTS 5,790,283 A * 8/1998 Catanzaro et al. ............. 359/9
5,859,947 A * 1/1999 Kiryuscheva et al. ....... 385/136
6,441,895 B1 * 8/2002 Kogan et al. ............... 356/127

FOREIGN PATENT DOCUMENTS

| JP | 62-75508 | 4/1987 |
| JP | 8-94886 | 4/1996 |
| JP | 8-262280 | 10/1996 |
| JP | 9-311250 | 12/1997 |

OTHER PUBLICATIONS

Emile AARTS, et a., John Wiley & Sons, pp. v–xii, "Simulated Annealing and Boltzmann Machines", 1989.
David E. Goldberg, Addison–Wesley Publishing Company, Inc., pp. iv–xiii, "Genetic Algorithms in Search, Optimization, and Machine Learning", 1989.
Hans–Paul Schwefel, John Wiley & Sons, Inc., pp. v–ix, "Evaluation and Optimum Seeking", 1995.

* cited by examiner

Primary Examiner—Mark Tremblay
(74) Attorney, Agent, or Firm—Oblon, Spivak, McClelland, Maier & Neustadt, P.C.

(57) ABSTRACT

A method is provided for adjusting the optical axis of a light transmission path that includes a plurality of optical components. The method uses an apparatus to sequentially adjust the optical axis of one or more of the optical components, using a probabilistic search technique to obtain optimum evaluation value with respect to light transmitted through the light transmission path.

26 Claims, 15 Drawing Sheets

OPTICAL AXIS ADJUSTMENT METHOD, AND STORAGE MEDIUM RECORDED WITH A PROGRAM THAT EXECUTES SAID ADJUSTMENT METHOD

BACKGROUND OF THE INVENTION

1. Field of the Invention

The present invention relates to a method of adjusting the optical axis of a light transmission path that includes various optical components. More particularly, this invention relates to an optical axis adjustment method for adjusting the axis of an optical path that includes optical components such as optical fibers, optical fiber arrays, lenses, light-emitting elements, light-receiving elements, semiconductor lasers, optical waveguides, mirrors, and so forth, and to a storage medium recorded with a processing program that executes said adjustment method.

2. Description of the Prior Art

In general, an optical path of an apparatus or system used in optical communications, optical measurements, laser processing and the like has many optical components connected thereto, such as optical fibers, flat plate waveguides, semiconductor lasers, and mirrors. As such, high-speed, high-precision adjustment of optical paths between optical components has become an important issue.

FIG. 1 shows how optical transmission loss can occur between components. In the case of FIG. 1(a), loss is caused by axial misalignment between two optical fibers; by a gap between fibers in FIG. 1(b); by the intersection between the axes of fibers shown by FIG. 1(c); and in the case of FIG. 1(d), by the end of one fiber being imperfectly shaped. Such problems are resolved mainly by using a connector that lines up the axes mechanically. However, associating other optical components, such as connecting an optical fiber and a flat plate waveguide, a semiconductor laser and a lens, and the lens to an optical fiber, for example, is difficult owing to the constraints imposed by the processing. Therefore, axial alignment of optical components is effected by using a precision positioning apparatus such as a stage that can be moved in fine increments.

In the example illustrated by FIG. 2, which relates to the adjustment of the axes of an optical fiber 10 and a light-receiving element 11, the optical fiber axis has five degrees of freedom: two displacements (x, y) perpendicular to the optical axis, two rotational amounts ($\theta x$, $\theta y$) about the perpendicular axes, and one displacement (z) along the optical axis. Taking the degrees of freedom as variables, the maximum intensity of light that has passed through the optical path can be found in accordance with a given search algorithm. Below, the above variable is referred to as an axial coordinate value. In the prior art, the hill-climbing method is used as the search algorithm. The hill-climbing method applied for adjustment of FIG. 2 will be explained with reference to FIG. 3.

First, with respect to the light-receiving element, the optical fiber is moved axially at a predetermined feed pitch to find a position at which the peak intensity can be obtained, from comparison of the respective intensities of the light received by the light-receiving element at the positions to which the optical fiber has been moved. This procedure is repeated for each of the X, Y and Z axes insofar as the intensity of the light received increases. Also, as disclosed in JP-A-HEI 09-311250, in order to reduce the search time, the feed pitch can be set using a plurality of steps, with coarse adjustment being followed by fine adjustment.

FIG. 4 shows the case of a local intensity peak rather than a monotonic increase distribution. Because the search will be terminated at such a local peak, in some cases, with the prior-art hill-climbing method, the search will not reach the true peak. In particular, when the optical path to be adjusted has a large number of degrees of freedom, such as when there is a plurality of components such as semiconductor laser, lenses, and optical fibers laid out in series along a single optical path that are to be connected together, there are many local peaks, which can cause the search to terminate before a sufficient received-light intensity is obtained.

In addition to the hill-climbing method, there is a method using vector searches, as described in JP-A-SHO 62-75508. This applies gradient measurement to effect a vector search. Although this requires fewer transitions than the hill-climbing method, it lacks means to confirm a true peak and therefore can be stopped at local peaks. There is also the method disclosed by JP-A-HEI 06-226415 and JP-A-HEI 07-62823 in which the search time is reduced by assuming a set shape for the received-light intensity distribution and using the results of the measurements to infer the shape parameters. However, this method also suffers from the problem that the search may be terminated at local peaks. Moreover, when the target intensity distribution differs markedly from the assumed distribution, it becomes impossible to perform an effective search without adding or modifying algorithms.

Thus, as described above, the prior art technology of adjusting the optical axes of optical components has problems that include much time required for the search, and trapping at local peaks that prevents the full received-light intensity being ascertained. Particularly with respect to the manufacture of optical modules in which optical elements such as light receivers and emitters are connected to optical fibers, the lengthy time required for axial adjustment increases the number of manufacturing steps, thereby decreasing productivity and raising costs.

Moreover, while the above explanation concerns axial adjustment between optical fibers and other optical components, the same problems arise when the optical path includes portions where the light is propagated through air. For example, in the case of a light transmission path in which a laser is used to transmit control signals or video signals between a movable section and a fixed control section of an apparatus, a laser beam is transmitted from an emission unit to a receiving unit. In such a case, it is necessary to effect axial adjustment of five degrees of freedom at the emission unit, as in FIG. 2. This axial adjustment requires much time and much labor. Also, when an optical path has a plurality of mirrors combined to reflect the alight, the same problems arise with respect to adjusting the positions of the mirrors. In laser processing, for example, in which the laser beam is transmitted precisely to a target point on the workpiece, the mirror angle is adjusted by hand while visually checking the mirror position. However, in a radiation or high-temperature environment or other such environment that does not allow a person to come close, adjustment has to be performed automatically from a remote location, using a sensor such as a CCD camera. In such cases, adjustment of multiple degrees of freedom of multiple mirrors is required. When this involves adjusting the position of mirrors several tens of centimeters in diameter, a major problem is that as a result of gravity-induced flexing or the like, displacement of one axis of a mirror affects the displacement of other axes. For example, displacing the X axis of a movable mirror can result in the simultaneous displacement of another axis, for example the Y axis, which should not be displaced. For this reason, the relationship between the amount of axial displacement and the deviation from the target position does not become monotonic. Moreover, when the hill-climbing method is used to effect automatic adjustment and adjustment is thrown off by the presence of local peaks, the amount of displacement from the target position becomes very large. In addition, in most cases in which axial adjustment is required in such an environment, evaluation values for adjustment include noise caused by axial deviation arising from extraneous mechanical noise and vibration, air fluctuations and so forth, causing divergence of searches based on the gradient method. That is, measured gradient values differ entirely owing to the presence of noise, and with more repetitions, searches go off in an increasingly unrelated direction.

Therefore, in consideration of the aforementioned points, an object of the present invention is to provide an optical axis adjustment method for a light transmission path that enables local peaks to be avoided and adjustment of optical axes of multiple degrees of freedom to be effected at high speed and in parallel, does not require addition or modification of algorithms to handle a shape of a transmitted light intensity distribution, and also has strong resistance to disturbance.

SUMMARY OF THE INVENTION

To attain the above object, the present invention provides a method for adjusting an optical axis of a light transmission path that includes a plurality of optical components, the method comprising using an adjustment apparatus to sequentially change an optical axis of a designated single optical component or multiple optical components among the plurality of optical components in accordance with a probabilistic search technique to obtain an optimum evaluation value for light transmitted through the light transmission path.

Since in accordance with the adjustment method of this invention the optical axis of a light transmission path that includes a plurality of optical components is adjusted by sequentially changing the optical axis of a specific optical component or multiple optical components in accordance with a probabilistic search technique to optimize the evaluation values of light transmitted through the light transmission path, it is possible to avoid local optimal evaluation values and effect high-speed axial adjustment of multiple degrees of freedom in parallel. Moreover, there is no need to add or modify algorithms to handle the shape of the transmitted light intensity distribution, and search performance is less subject to degradation caused by disturbance.

Here, the evaluation value of light transmitted through a light path can be represented by a function F which takes as arguments the coordinate values of the plurality of adjustable optical axes that the light path includes. Optimizing the evaluation value of the transmitted light is equivalent to finding the optimum solution to the function F. The present inventors took note of this point and discovered that genetic algorithms and other probabilistic search techniques are applicable to the axial adjustment of an optical transmission path.

Genetic algorithms are a type of probabilistic search technique, that (1) are effective in wide-area searches, (2) do not require differential values or other derived information other than the evaluation function F, (3) are readily implemented, and (4) are not readily influenced by disturbance. Therefore, in the present invention, a genetic algorithm can be used in searches for optimum optical axis coordinate values with the adjustment apparatus. Also, after sequentially changing the optical axis according to a genetic algorithm, the hill-climbing method can be used to find the optimum axis coordinate values, thereby making it possible to shorten the adjustment time.

In addition, in the event that the aforementioned evaluation function F satisfies special conditions, it is possible to improve the search efficiency by replacing the genetic algorithm with the simulated annealing method, which is also a probabilistic search technique. Therefore, in the present invention, the simulated annealing method may also be used in searches for optimum optical axis coordinate values with the adjustment apparatus. Although the performance obtained thereby is lower than that obtained with a genetic algorithm, the adjustment time can be shortened.

Moreover, the coordinate values can be measured while the optical axis is being changed by the adjustment apparatus, stored in a memory paired with the evaluation value of the transmitted light, and the pair of axial coordinate values with the largest evaluation value among the pairs taken as a local optimum solution. Doing this makes it possible to improve search efficiency and greatly reduce the search time. Also, when the adjustment apparatus is searching for the optimum coordinate values, light intensity may be used as the transmitted light evaluation value. Again, when the adjustment apparatus is searching for the optimum coordinate values, the amount of positional deviation of the light may be used as the transmitted light evaluation value.

With respect to the above-described optical axis adjustment method of this invention, the light transmission path may include optical fibers and optical fiber arrays. The light transmission path may also include optical components such as lenses, light-emitting elements, optical waveguides, mirrors, and so forth.

The adjustment apparatus used in the optical axis adjustment method may include an electronic computer and a storage medium that can be read by the electronic computer. When using a probabilistic search technique to search for optical axis coordinate values for one or a plurality of optical components that provide the optimum evaluation values with respect to light transmitted through the light transmission path, this will make it possible to readily and securely process the searches in a short space of time.

The present invention also includes a storage medium recorded with an adjustment program that is executed by the electronic computer to use probabilistic search techniques to search for optical axis coordinate values for one or a plurality of optical components that provide the optimum evaluation values with respect to light transmitted by a light transmission path. By enabling the adjustment program executed by the computer for the optical axis adjustment method of this invention to be stored, the storage medium enables adjustment of optical apparatuses to be carried out anywhere.

The above and other objects, further features of the invention, its nature and various advantages will be more apparent from the accompanying drawings and following detailed description of the invention.

DESCRIPTION OF THE PREFERRED EMBODIMENT

Embodiments of the present invention will now be described with reference to FIGS. 5 to 21.

Figure 5:
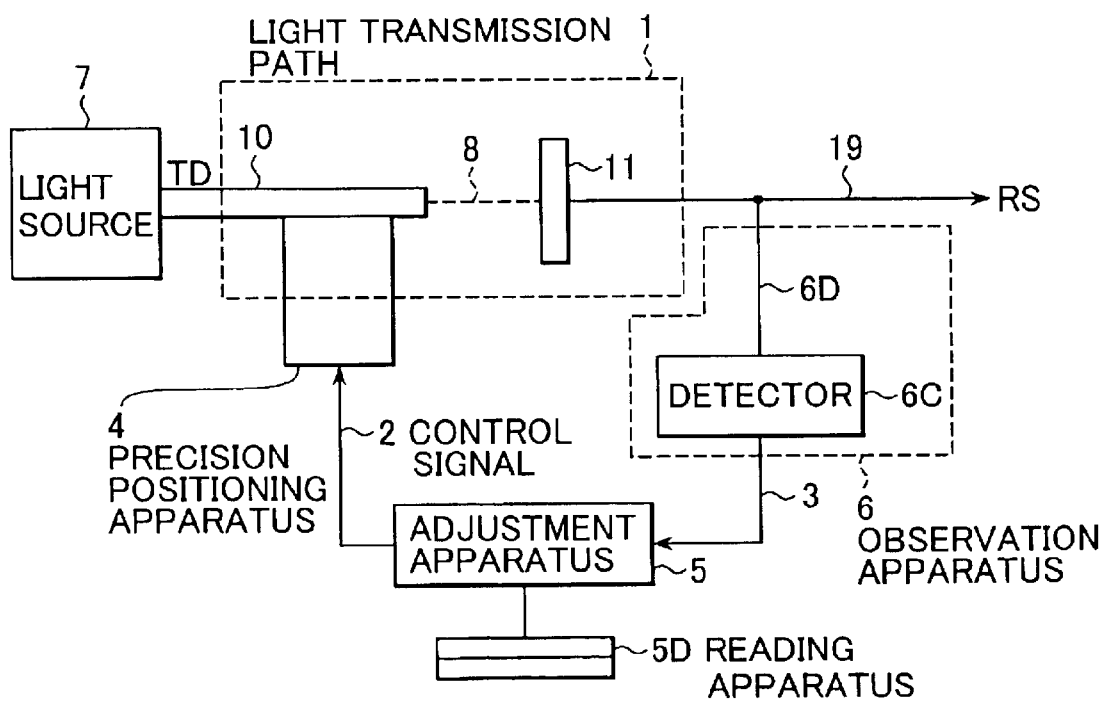
FIG. 5 is a structural diagram showing an example of an optical axis adjustment method according to a first embodiment of the present invention.

FIG. 5 shows a system used for optical axis adjustment of a light transmission path configured for an optical axis adjustment method that is a first embodiment of the present invention. In FIG. 5, reference numeral 1 denotes a light transmission path that includes a plurality of optical components, numeral 10 denote is an optical fiber the axial coordinate values of the end of which can be changed in accordance with the value of a control signal (adjustment signal) 2, and numeral 11 denotes a light-receiving element the axial coordinate values of which are not changed. Further, reference symbol TD denotes transmission data. The optical fiber 10 and light-receiving element 11 are structural elements of the light transmission path 1. The light-receiving element 11 is also used to convert received light into electrical received-light signals RS. Reference numeral 4 denotes a precision positioning apparatus bonded to the end of the optical fiber 10 for changing the axial coordinate values of the optical fiber 10 in accordance with values of the control signal 2. Reference numeral 5 denotes an adjustment apparatus that, in accordance with the method of this invention, is used for adjusting the axial coordinate values of the end of the optical fiber 10 by outputting control signals 2 to the precision positioning apparatus 4, and numeral 6 denotes an observation apparatus for measuring the intensity of light received by the light-receiving element 11 and outputting an evaluation signal 3. The observation apparatus 6 contains a light detector 6C and a lead wire 6D.

With further reference to FIG. 5, light 8 from a light source 7 is transmitted through the light transmission path 1 to the light-receiving element 11, which causes a received-light signal RS to be transmitted to the other apparatuses via transmission lead wire 19. The received-light signal RS is also input to the observation apparatus 6. An evaluation signal 3 output from the observation apparatus 6 is input to the adjustment apparatus 5. In the specification and drawings, items having the same reference numerals or symbols are the same or corresponding items.

FIG. 5 shows an example of the location of the optical fiber 10 and light-receiving element 11, and of the light path in respect of the optical components concerned. An actual configuration is determined by the design of the light transmission path. As described, the optical fiber 10 is an optical component, the axial coordinate values of which are adjusted by the method of this invention, and the light-receiving element 11 may be an optical component, the axial coordinate values of which are adjusted by the method of the invention. However, the adjustment may be accomplished by other methods. For example, immediately after installing the light transmission path, coarse adjustment may be carried out manually or by a prior art method. The optical fiber 10 may be a single-mode fiber or a multimode fiber. The light-receiving element 11 may be a photodiode or avalanche photodiode or the like.

Figure 1A:
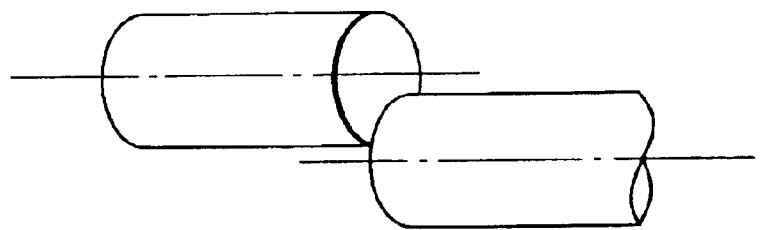
FIG. 1 is a diagram used to explain factors causing transmission loss in optical fibers, with FIG. 1(a) showing axial misalignment between two optical fibers, FIG. 1(b) showing a space between two fibers, FIG. 1(c) showing intersection of the axes of two fibers, and FIG. 1(d) showing a fiber having an imperfectly shaped end.
Figure 1B:
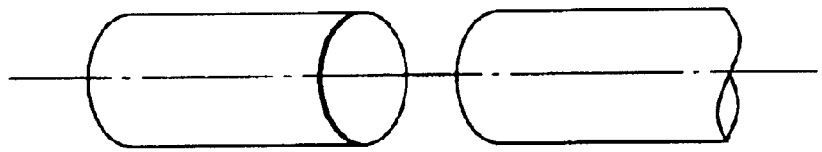
Figure 1C:
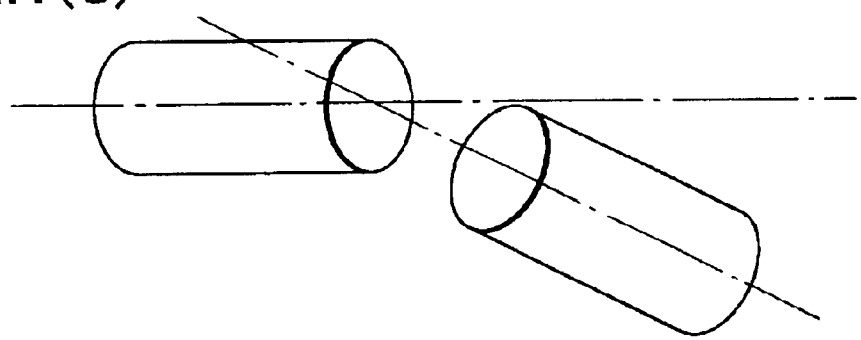
Figure 1D:
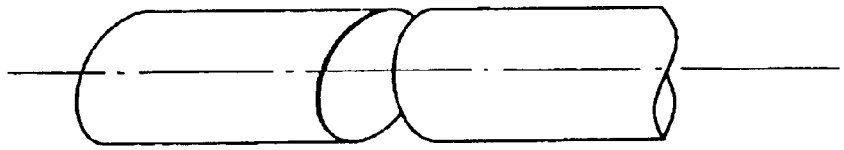
Figure 2:
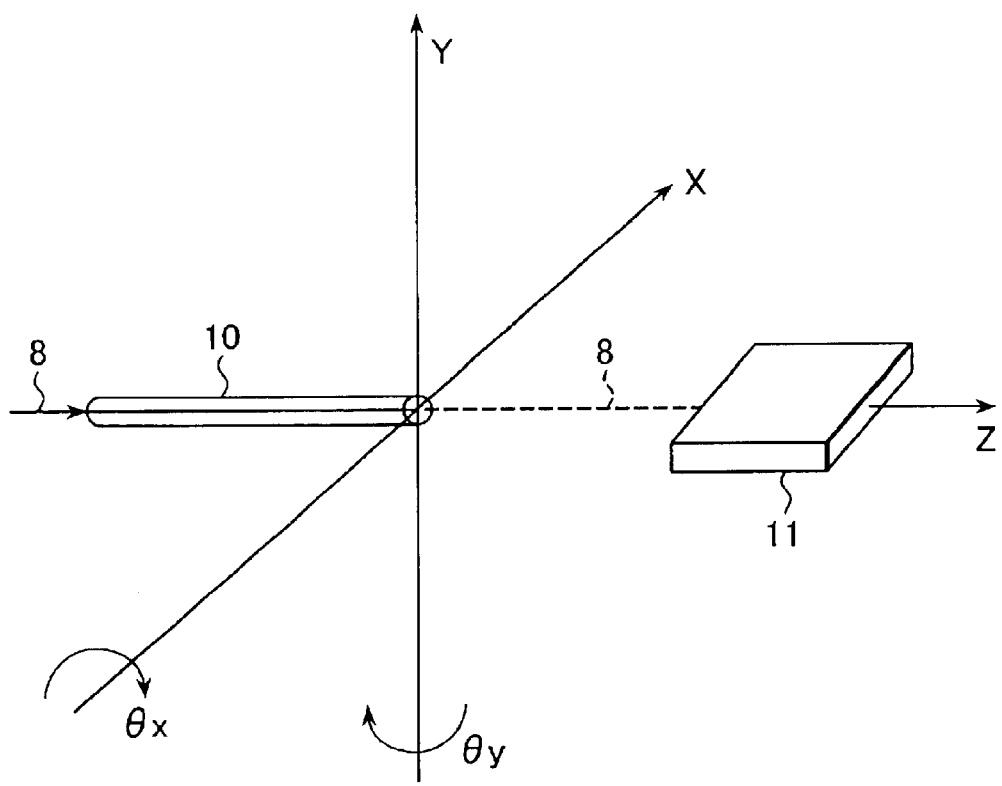
FIG. 2 is a diagram used to explain the coordinate system of an optical fiber.
Figure 3:
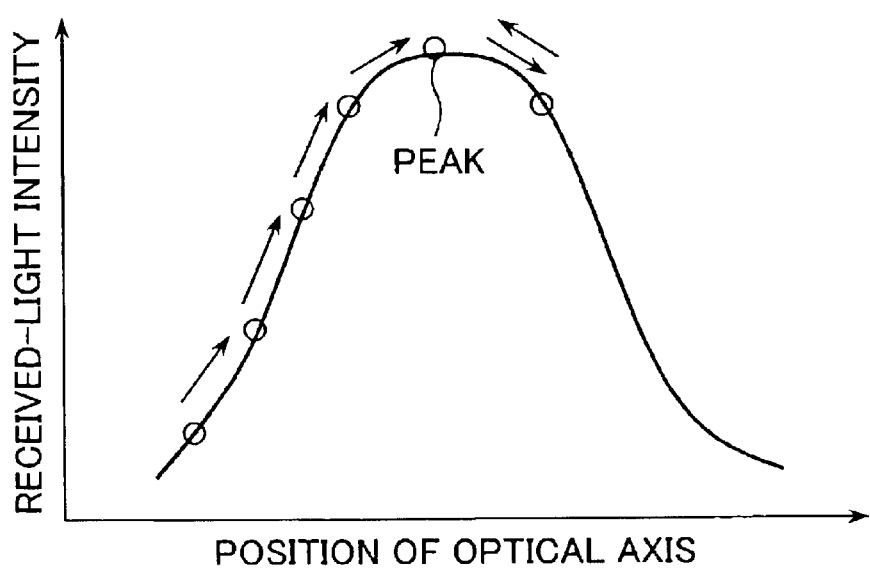
FIG. 3 is a diagram used to illustrate the hill-climbing method employed in the prior art as a search algorithm.

As shown in FIG. 2, with respect to the axial coordinate values of the optical fiber 10, there are five degrees of freedom: the displacements x, y and z on the X axis, Y axis and Z axis respectively of an orthogonal coordinate system, for example, the rotational amount θx around the X axis and the rotational amount θy around the Y axis. The base point of the coordinate system is the initial position at the time the transmission path is set up. The light-receiving element 11 converts the received-light quantity into an electrical signal which, via lead wires 19 and 6D, is transmitted as received-light signal RS to the other apparatuses and to the light detector 6C. During optical axis adjustment according to this invention, the light source 7 outputs a signal of a specific intensity. The light detector 6C sends an evaluation signal 3 to the adjustment apparatus 5. The evaluation signal 3 shows the amplitude of the signal input to the detector 6C. In this embodiment, light intensity is used as the evaluation value of light transmitted through the light transmission path.

The adjustment apparatus 5 reads the evaluation signal 3, uses a genetic algorithm to search for the optimum axial coordinate values for the optical fiber 10, and outputs a control signal 2 that sets the coordinate values. In accordance with the control signal 2, the precision positioning apparatus 4 adjusts the axial coordinate values of the optical fiber 10. The precision positioning apparatus 4 can be comprised of a drive mechanism such as a stepper motor, a piezoelectric element or the like; in such a case, the positioning apparatus 4 may also include a controller. The adjustment apparatus 5 may consist of a personal computer, microcomputer or other electronic computer equipped with computer-readable storage media and an apparatus 5D for reading storage media. In the above electronic computer, the adjustment algorithm based adjustment program is stored on recording media such as hard disk, ROM (read-only memory), optical disk, magneto-optical disk, flexible disk, magnetic disk, flash memory, ferroelectric memory, magnetic MRAM, semiconductor memory with backup function and so forth. In addition, the adjustment program may be transmitted or distributed via a network.

Figure 4:
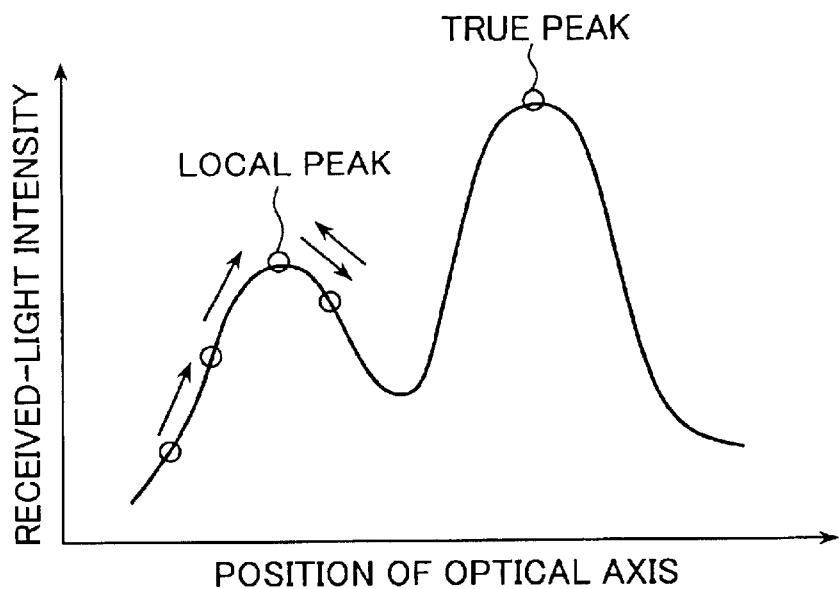
FIG. 4 is a diagram used to explain problematic points of the prior art hill-climbing method.

As described above with reference to FIG. 4, a search implemented using a prior art technique will often be terminated by the presence of local peaks because the axis of the optical fiber 10 of the light transmission path 1 to be adjusted has five degrees of freedom. In this regard, the following adjustment method using the genetic algorithm in accordance with this invention is highly effective. After the light transmission path has been set up, the light source 7, adjustment apparatus 5, precision positioning apparatus 4 and light detector 6C shown in FIG. 5 are positioned. Then, the optical axes are adjusted in accordance with the sequence shown by the flowchart of FIG. 6.

In step S1, the light source is operated and the optical fiber 10 (or light-receiving element 11) is adjusted approximately, by hand or by a prior art method, and the adjustment apparatus 5 and detector 6C are initialized. In the following adjustment, the axial coordinate values are set as the reference points (x0, y0, z0, θx0, θy0). In step S2, the detector 6C transmits to the adjustment apparatus 5 an evaluation signal denoting the intensity of the light received by the light-receiving element 11. In step S3, the adjustment apparatus 5 determines whether or not the received-light intensity exceeds a predetermined level.

If the intensity does not exceed the predetermined level, in step S4 the adjustment apparatus 5 outputs a control signal 2 to have the optical axial coordinate values adjusted in accordance with a probabilistic search technique. Then, in step S5, the system implements a standby of a fixed length to allow the precision positioning apparatus 4 to come to a stop. Then, in step S6, it is determined whether or not termination conditions have been satisfied. If the termination conditions have been satisfied, in step S7, after processing to handle defective items, the process is terminated. If the termination conditions are not satisfied, the process reverts to step S2. This process sequence is executed repeatedly. This processing ends when the performance of the optical apparatus is determined to have satisfied the predetermined condition of step S3.

Here, the intensity of the light received by the light-receiving element 11 can be represented by a function F which takes as arguments the axial coordinate values of the optical fiber 10. Maximizing the received-light intensity is equivalent to obtaining the optimum solution to the function F. Focusing on this point, the present inventors discovered that genetic algorithms could be applied to adjusting the optical axis of the optical fiber 10.

Genetic algorithm reference literature includes "Genetic Algorithms in Search, Optimization, and Machine Learning," by David E. Goldberg, published in 1989 by Addison-Wesley Publishing Company, Inc. The genetic algorithm referred to in the present invention is an evolutionary computational technique that also includes evolution strategy (ES) techniques. Evolution strategy reference literature includes "Evolution and Optimum Seeking," by H. P. Schwefel, published in 1995 by John Wiley & Sons.

In a typical genetic algorithm, first a population of virtual organisms which have genes is established, and individuals that adapt to a predetermined environment are given a higher probability of surviving and leaving progeny, the probability being based on the level of their fitness. The offspring inherit the genes of their parents through a process called a genetic operation. After generations of this, the genes and population of organisms evolve to the point where individuals having a high fitness form the majority of the population of organisms. Moreover, the genetic operations used at this time include the crossing and mutation of genes, and the like which also occur during the propagation of actual organisms. This genetic operation includes the crossover and the mutation of genes occurring during reproduction.

Figure 7:
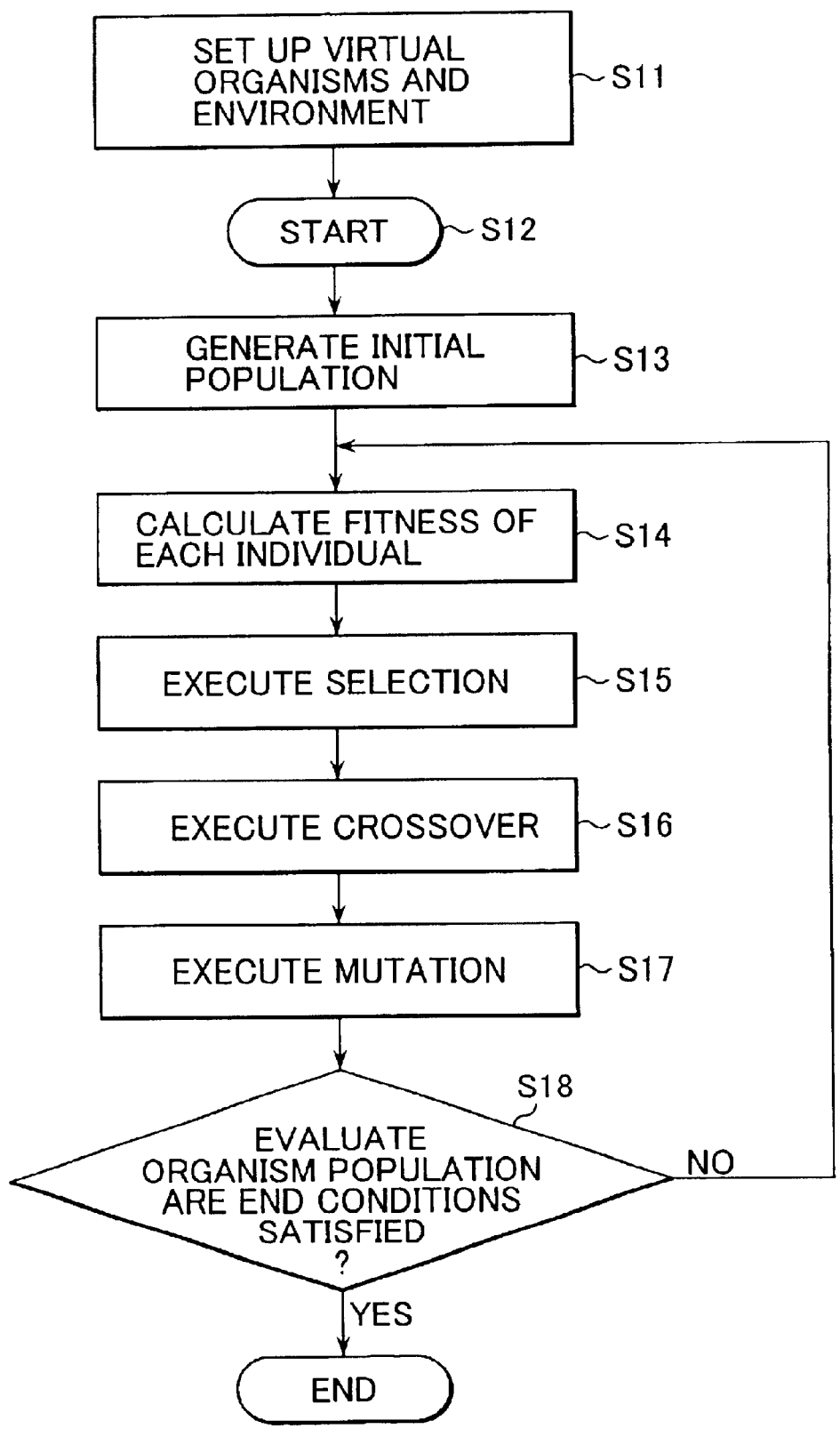
FIG. 7 is a flowchart showing an overview of the sequence of a typical genetic algorithm.
Figure 8:
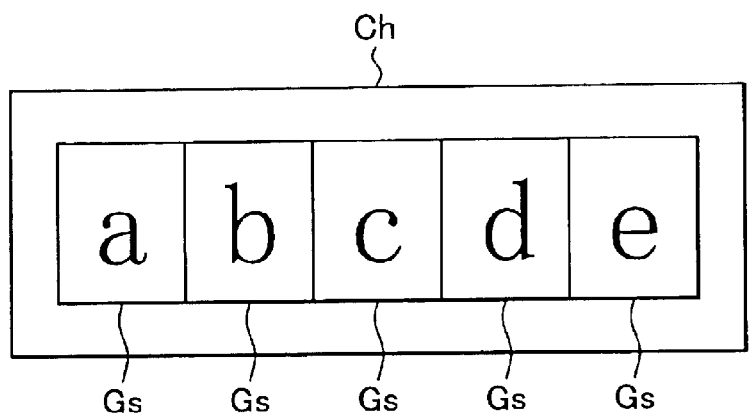
FIG. 8 is an explanatory view showing an example of a chromosome used in a genetic algorithm.

FIG. 7 is a flowchart showing the sequence of the typical genetic algorithm. In step S11, the chromosome of an individual is determined, that is, what data will be transmitted from an individual parent to an individual offspring from generation to generation, and the form of the data. FIG. 8 shows an example of a chromosome. Here, the variable vector x in the optimization problem to be solved is represented as a sequence of M symbols Ai (i=1, 2, ... M), which is regarded as a chromosome consisting of M gene loci. In FIG. 8, Ch denotes the chromosome and Gs the gene loci and the number of gene loci M is 5. Gene values Ai can be pairs of integers, real numbers within a certain range or a just a sequence of symbols or the like, and are determined depending on the problem. In the example of FIG. 8, the letters a through e are the genes. A set of genes encoded in this manner is the chromosome of an individual.

Next in step S11, the method of calculating the fitness which represents the degree to which each individual is fit for the environment is determined. This is designed so that the higher the variable or the lower the variable which is the value of the evaluation function for the optimization problem in question, the higher the fitness of the corresponding individual becomes. In the subsequent change of generations, the higher the fitness of an individual, the higher the probability that it will survive and leave descendants, as compared to individuals with a lower fitness. Conversely, individuals with a low fitness are assumed to be individuals that do not adapt well to the environment and therefore are allowed to die out. This reflects the principle of natural selection in the theory of evolution. That is, fitness becomes a measure of the degree of superiority of each individual in terms of survivability.

In the genetic algorithm, at the start of the search, the problem to be solved is typically a black box, it being completely unknown as to what kind of individual being preferable. The initial organism population is therefore generated randomly using random numbers. So, here too, in step S13, following the initiation of the processing in step S12, the initial population of organisms is generated randomly using random numbers. If there is some prior knowledge regarding the search space, it is possible to concentrate the organism population at places where the evaluation value is expected to be high. The total number of individuals to be generated is referred to as the population size.

In step S14, the fitness of each individual within the population is calculated based on the calculation method determined previously in step S11. Once the fitness of each individual is set, in step S15 individuals are selected from the population to form the foundation of the next generation. However, if just selection were performed, the proportion of the individuals within the population that have the highest fitness at that point in time would simply increase, and no new search points would be generated. This is why the crossing and mutation operations described below are performed.

In step S16, pairs of individuals are selected randomly at a stipulated frequency of occurrence from among the individuals of the next generation generated by selection, and their genes are combined (crossed) to create the genes of the offspring. Here, the probability of crossing occurring is called the crossing rate. Individual offspring generated by crossing inherit characters from each parent. Crossing increases the diversity in the individuals' chromosomes, producing evolution.

Following the crossing process, in step S17 the genes of an individual are subjected to changes (mutations) at a predetermined probability. Here, the probability of mutation occurring is called the mutation rate. The phenomenon of genetic content being rewritten at a low probability is also seen in the genes of actual organisms. However, if too high a mutation rate is used, a feature of genetic characters being inherited from parents through crossing is lost, so this would be the same as random search through the search space. Thus, care is needed in this regard Once the population of the next generation is determined by this process, in step S18, a determination is made as to whether or not the population of organisms in the next generation thus generated satisfies the termination criteria for ending the search. These termination criteria will vary depending on the problem, but typical criteria include the following.

The maximum fitness of the organism population is greater than a certain threshold value.

The average fitness of the organism population is greater than a certain threshold value.

Generations wherein the rate of increase in fitness of the organism population is at or below a certain threshold value have continued for a period longer than a fixed period.

The number of generations has reached a predetermined number.

If any termination criterion is met, the process ends and moves to step S19. The individual among the organism population that exhibits the highest fitness at this point is taken to be the solution to the optimization problem. If no termination criterion is met, the process returns to the calculation procedure of step S14, and the search continues. By repeating the change of generations in this manner, the number of individuals in the population can be kept constant while the fitness of individuals is increased. This completes the overview of a typical genetic algorithm.

Figure 10:
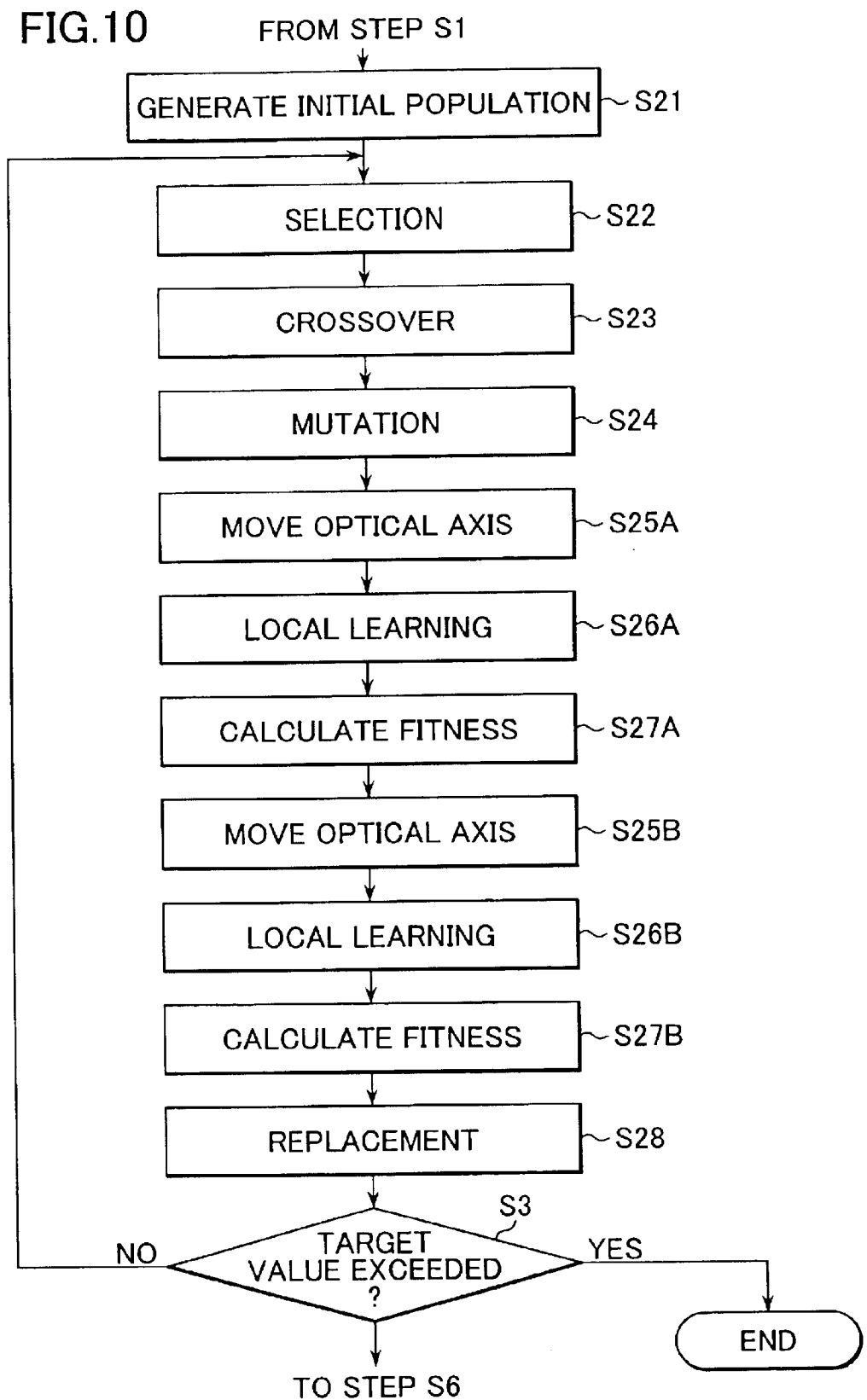
FIG. 10 is a flowchart showing the processing sequence when using the genetic algorithm in the method of the above embodiment.

The above outline of the genetic algorithm is a general one that does not prescribe details of the actual programming nor of algorithms for individual problems. To apply a genetic algorithm to the adjustment of this embodiment, the following items need to be implemented.

a: method of representing chromosomes
b: evaluation function for individuals
c: method of selection
d: crossing method
e: mutation method
f: termination criteria FIG. 10 is a flowchart that shows the processing sequence of the adjustment apparatus 5 using the genetic algorithm in this embodiment. Note that the process in this FIG. 10 shows the process of steps S2 to S5 of FIG. 6 in specific detail. A feature of this embodiment is that the axial coordinate values are used directly as the gene data of the genetic algorithm, so there is no need for any processing or the like to convert the chromosome information into coordinate values. This makes it possible to optimize the axial coordinate values in parallel rather than sequentially.

Figure 9:
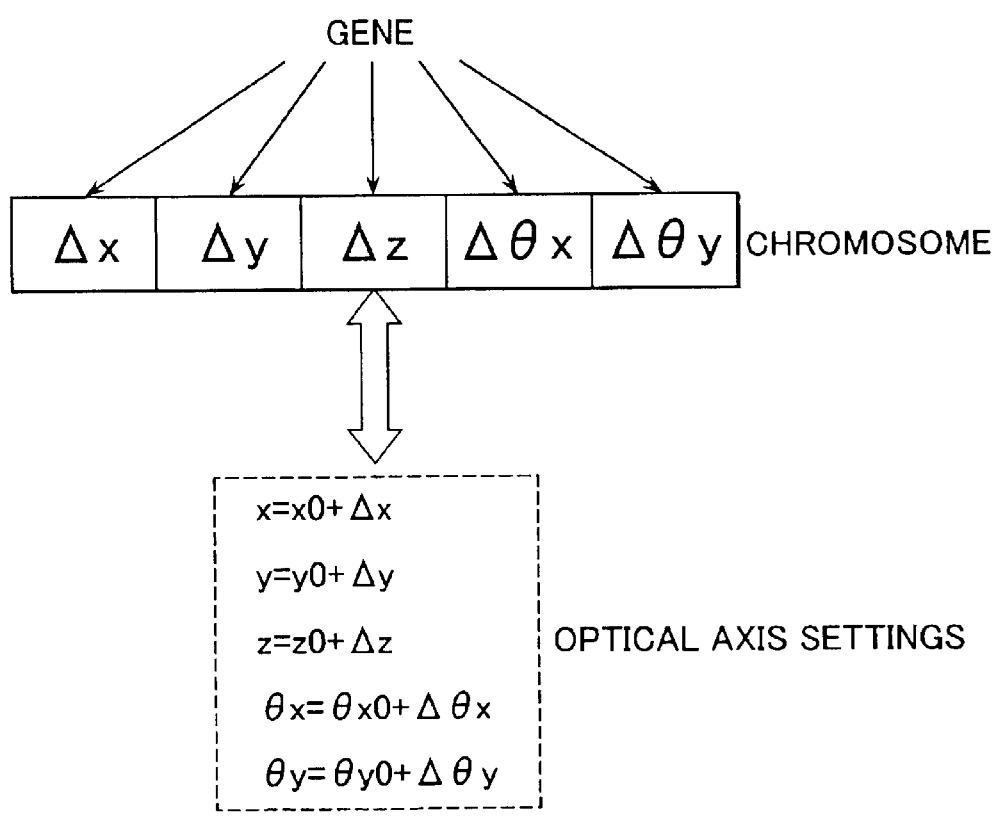
FIG. 9 is an explanatory view showing an example of a chromosome used in a genetic algorithm in the method of the above embodiment, and the optical coordinates determined using the same.

This optimization will now be explained with reference to the example shown in FIG. 9. When the coordinate values of the optical axes are $(x, y, z, \theta x, \theta y)$, the chromosomes of the genetic algorithm are denoted in terms of the displacement $(\Delta x, \Delta y, \Delta z, \Delta \theta x, \Delta \theta y)$ from reference position $(x0, y0, z0, \theta x0, \theta y0)$. That is, a one-to-one correspondence is effected between the axial coordinate values at the end of the optical fiber and the gene data of the genetic algorithm.

As the evaluation function F (that is, the fitness) for individuals in the genetic algorithm used in the processing of FIG. 10, a function is used that represents the received-light intensity measured by the detector 6C after the optical axis of the optical fiber 10 is changed to the axial coordinate values that represent the chromosomes of the individuals. For example, when the evaluation signal from the detector 6C is 6.2 mV, the fitness value is set at 6.2.

In order to be used in the processing shown in FIG. 10, in step S21, a plurality of individuals as the initial population of the genetic algorithm are prepared using uniform random numbers. In this case, this means that the value of each gene of each chromosome in the initial population takes a random real-number value between the upper limit and the lower limit. However, if there is some prior knowledge regarding initial axial deviation values, the initial population can be formed using individuals thought to have a higher fitness.

With respect to the initial population, the optical axes are moved in accordance with values representing the chromosomes, and fitness values are set based on evaluation values from the detector 6C. Next, searches are performed, with the selection of step S22, the crossing of step S23, the mutation of step S24, the local learning of steps S26A and 26B (described later) and the replacement of step S28. This technique is distinguished by the fact that a portion of the individuals in the population are repeatedly replaced, not all of the individuals as in the case of typical genetic algorithms. This makes it possible to conduct searches using small populations.

If it is determined in step S3 that the received-light intensity exceeds the predetermined value, the adjustment process is terminated. However, if no chromosomes (axial coordinate values) that exceed the predetermined value are obtained even after performing the adjustment process repeatedly for a fixed number of generations, the light transmission path concerned is deemed to be defective and is processed as such in step S7 of FIG. 6.

Figure 11:
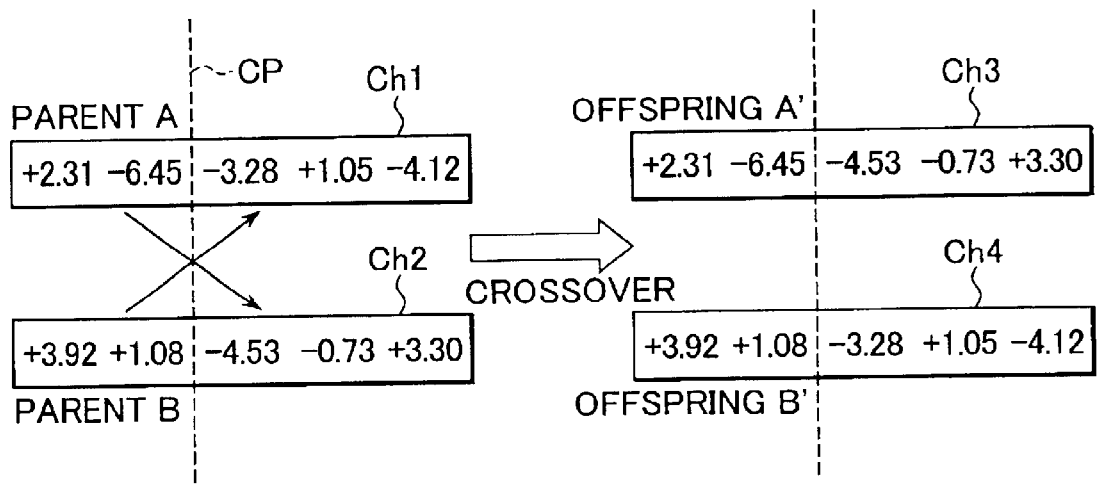
FIG. 11 is an explanatory view showing the sequence of the crossover process performed in the genetic algorithm of the method of the above embodiment.

In the selection process of step S24, two parent individuals A and B are selected at random from the population for genetic operation. In the crossing process of step S23, the method shown in FIG. 11 is used. This is an operation in which, as clusters of coordinate values, the chromosomes are partially exchanged at random positions, a technique called one-point crossover. With reference to FIG. 11, in this crossing process, Ch1 and Ch2, which are the chromosomes of parents A and B, are cut at a randomly selected crossing point CP. In the example of FIG. 11, the point between the second and third genes from the left is the crossing point. Exchanging the cut partial genotypes produces offspring. A' and B' having chromosomes Ch3 and Ch4. Two-point crossover or uniform crossover can be used instead of one-point crossover.

Figure 12:
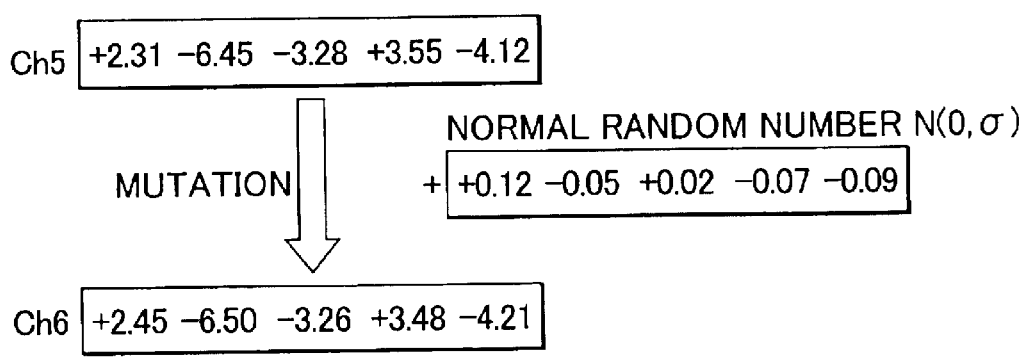
FIG. 12 is an explanatory view showing the sequence of the mutation process performed in the genetic algorithm of the method of the above embodiment.

The mutation of step S24 that is effected following the crossing of step S23 is an operation that adds to the genes of each chromosome of offspring A' and B' normal random numbers generated according to a Gaussian distribution $N(0, \sigma)$. FIG. 12 shows an example of mutation. In this figure, the normal random numbers N generated according to a Gaussian distribution are added to the chromosome Ch5, which is changed to chromosome Ch6. A Cauchy distribution can be used instead of a Gaussian distribution. When the mutation of step S24 ends, the chromosome values of the offspring A' and B' thus obtained are used in steps S25A and S25B to change the optical axial coordinate values by starting of the precision positioning apparatus 4, and the fitness values of the offspring A' and B' are calculated in steps S27A and S27B.

Changing the axial coordinate values can take from 10 to 100 times the length of time required for observation of the received-light intensity by means of the detector 6C. An adjustment method was therefore invented that allowed the detector 6C to be operated even while the axial coordinate values are being changed, enabling the search to be conducted efficiently using the detected values. This method was dubbed local learning, and can be executed in steps S26A and S26B. If the time required for the observation of the received-light intensity by the detector 6C is greater than the time required to change the axial coordinate values, the process moves to step S28 without performing local learning.

Figure 13:
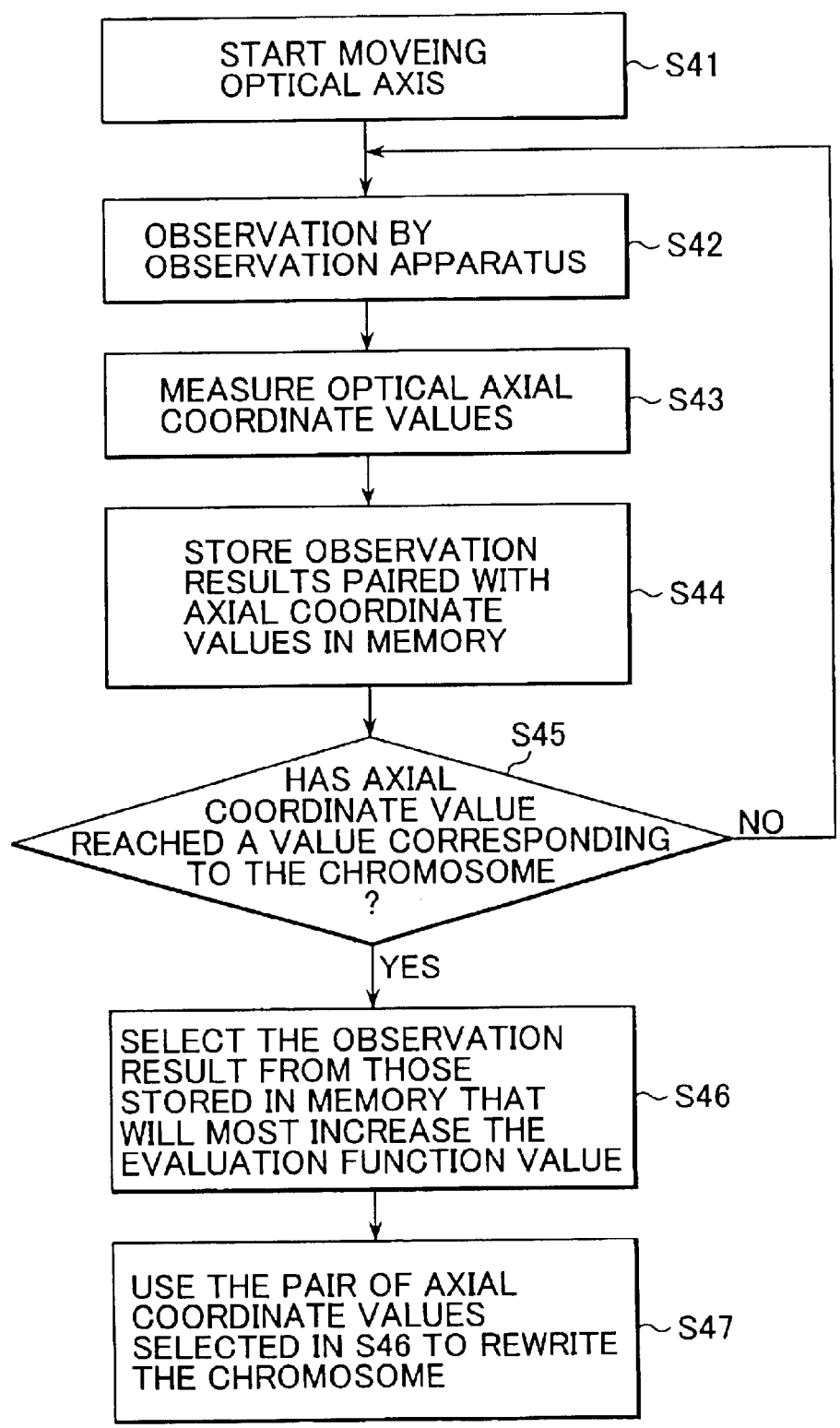
FIG. 13 is a flowchart showing the sequence of the local learning performed in the genetic algorithm in the method of the above embodiment.

The local learning process of step S26A and step S26B uses the method shown in FIG. 13. In this method, in step S41 the positioning apparatus 4 is operated to start the optical axis adjustment, in step S42 the detector 6C is used for observation of the received-light intensity, and at the same time, in step S43, the axial coordinate values are computed. This measurement can be performed using a commercially available position sensor that is capable of measuring positions in submicron units. If a stepper motor is used for the positioning apparatus 4, the positional measurement can be omitted and the axial coordinate values calculated by synchronizing the detection operation of the detector 6C with the stepping pulses. In step S44, the received-light intensity and axial coordinate values obtained in steps S42 and S43 are stored in a memory in the adjustment apparatus 5.

Steps S42 to S44 are repeated until it is determined in step S45 that the axial coordinate values correspond to the chromosomes. When that has been determined, in step S46, of the pairs of received-light intensity and axial coordinate values stored in the memory, the pair is selected in which the value of the evaluation function F is greatest, which is to say the local optimum solution. Finally, in step S47, the axial coordinate values of the pair of values selected in step S46 are used to replace the chromosome.

With respect to the above local learning process, an example of an operation relating to the adjustment of an optical axis having two degrees of freedom (x, y) will now be described with reference to FIG. 14. First, the axial coordinate values prior to the initiation of the axial changes of step S41 are taken to be $(x_S, y_S)$, and the axial coordinate values denoting the chromosomes targeted in step S41 are taken to be $(x_E, y_E)$. In the loop from step S42 to step S45, the axial coordinate values are gradually changed from $(x_S, y_S)$ to $(x_E, y_E)$ by the positioning apparatus 4, and in step S44, a plurality of pairs of values each comprising an axial coordinate value being changed and the corresponding observed received-light intensity value are stored in the memory. Then, in step S46, of the stored pairs, the pair having the highest evaluation value (fitness) is selected. In the case of this example, the value of the evaluation function takes the maximum of $F_M$ when the axial coordinate values are $(x_M, y_M)$, so the pair $(x_M, y_M)$ is selected in step S46. Lastly, in step S47, the values of the chromosome are rewritten to the values corresponding to the axial coordinate values $(x_M, y_M)$.

Figure 14:
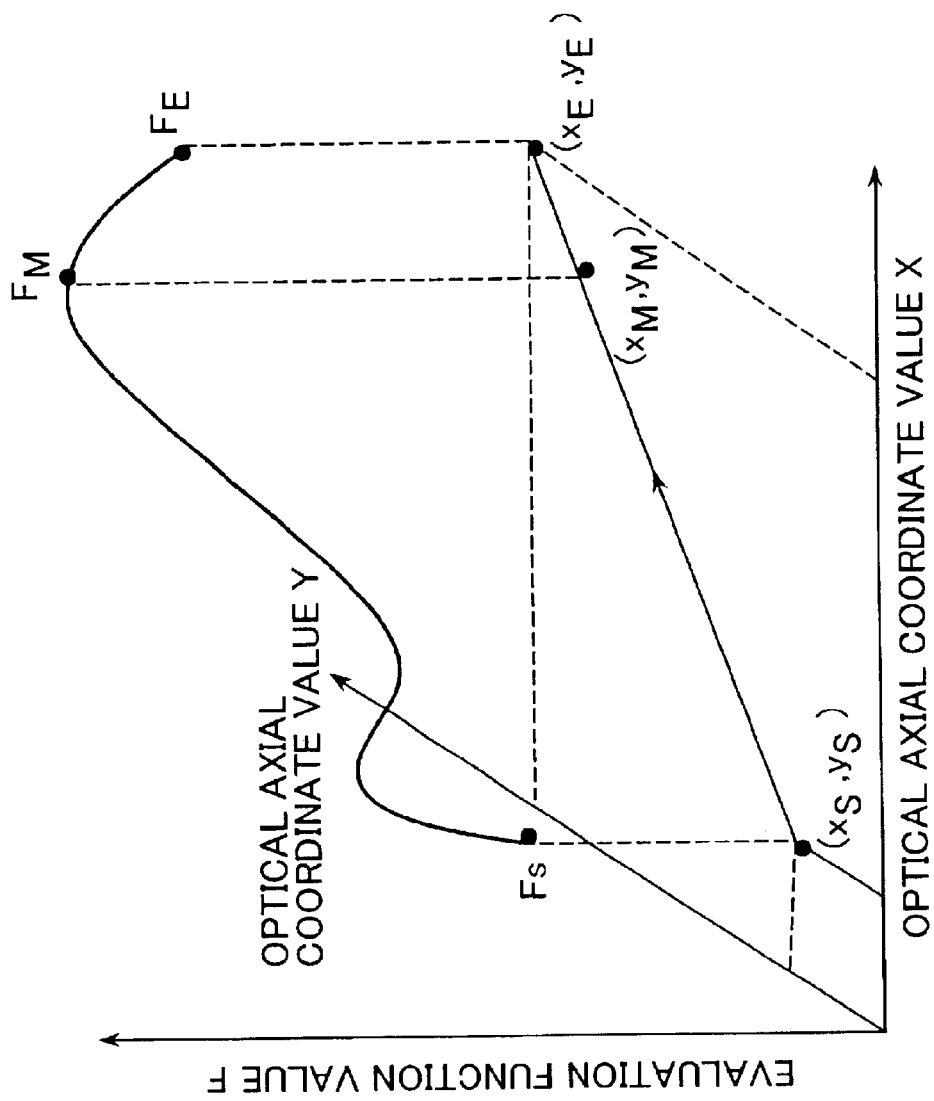
FIG. 14 is an explanatory diagram showing an example of the operation of the above local learning method.
Figure 15:
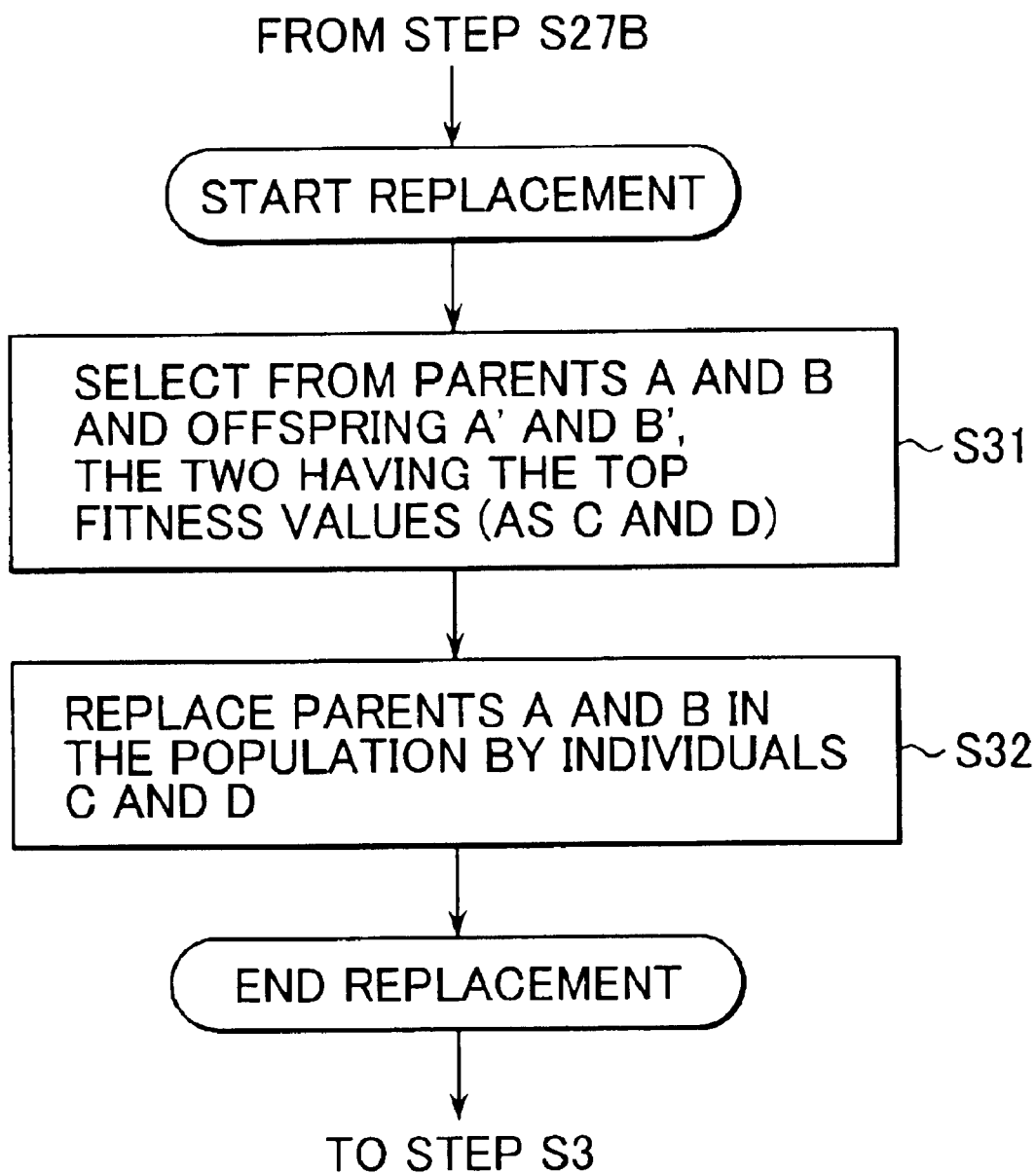
FIG. 15 is a flowchart showing the sequence of the replacement process performed in the genetic algorithm of the method of the above embodiment.

If local learning is not performed in the example of FIG. 14, searching (observation) is performed only twice, when the axial coordinate values are $(x_S, y_S)$ and $(x_E, y_E)$, so the axial coordinate values $(x_M, y_M)$ that cause the evaluation value to become $F_M$ cannot be discovered. However, when local learning is performed, observation is performed even while the axial coordinate values are being changed, so searching is performed at a plurality of axial coordinate values (roughly 10 to 100) other than $(x_S, y_S)$ and $(x_M, y_M)$, so $(x_M, y_E)$ can be discovered. Moreover, since the chromosome is rewritten with the axial coordinate values corresponding to this $(x_M, y_M)$, the search efficiency is greatly improved.

The fitness of offspring A' is calculated in steps S25A to S27A, and that of offspring B' is calculated in steps S25B to S27B. Next, in step S28, individual replacement is performed in accordance with the flowchart of FIG. 15. In step S31, of the four individuals, parents A and B and offspring A' and B', the two individuals having the top fitness values are selected and named individuals C and D. Then, in step S32, parents A and B in the population are replaced by the individuals C and D. In accordance with this technique, replacement is not performed when the parents have a higher fitness than the offspring, increasing the selection pressure and decreasing the convergence time. A normal generation model selection method, neighborhood model GA and non-generation model GA are other known selection methods that can be used.

When the above crossing, mutation, evaluation, local learning and replacement operations are repeatedly performed and it is determined in step S3 that the received-light intensity has exceeded the target value, the adjustment process is terminated. In the case of a genetic algorithm, the search speed may fall in the final stages of the search. The reason is that, since it is a global search method, it cannot compare to the hill-climbing method in terms of the speed at which a given local peak is reached. The search time can be reduced by using a genetic algorithm based search, followed by the use of the hill-climbing method for fine adjustment purposes. As a reference for deciding when to change from the genetic algorithm method to the hill-climbing method, the switch can be made when 90% of the initial received-light intensity target value has been attained.

As described in the foregoing, in accordance with the optical axis adjustment method of this embodiment, a genetic algorithm is used to find the axial coordinates of the optical fiber 10 at which the intensity of the light received by the light-receiving element 11 is at a maximum. Therefore, the optical axes can be speedily and automatically adjusted in parallel without precision manual adjustment by a skilled technician and without the search process being trapped at local peaks. In terms of production of optical modules, the result is a major improvement in workability and productivity.

Figure 16:
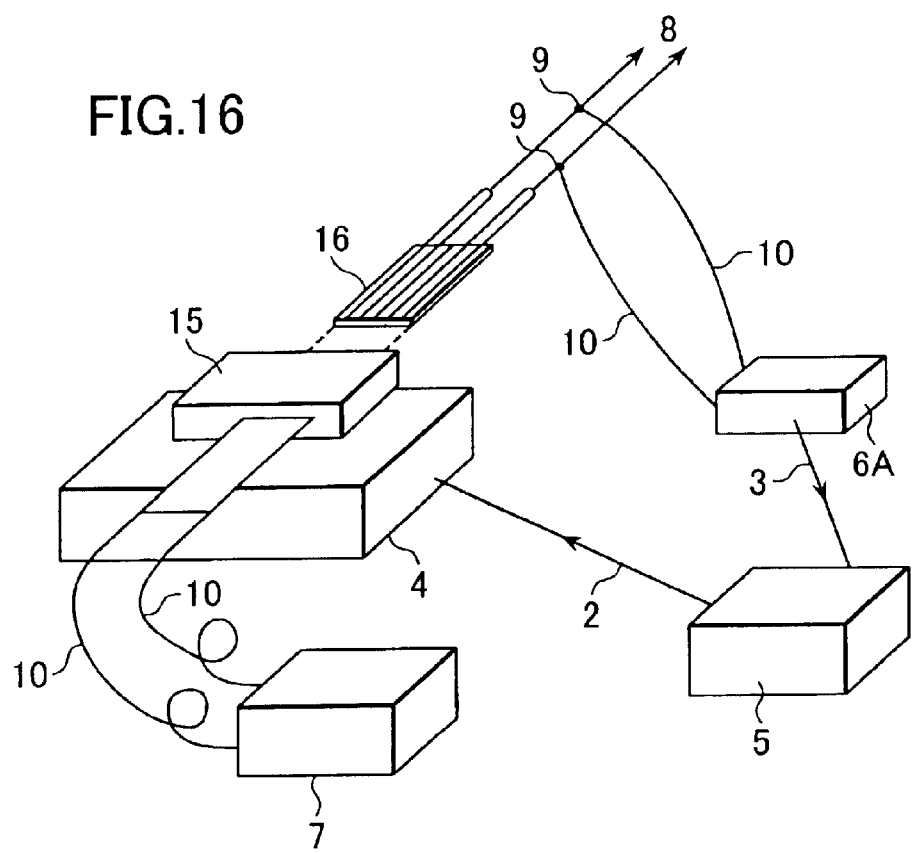
FIG. 16 is a structural diagram of an optical axis adjustment method according to a second embodiment of the present invention.

FIG. 16 shows an arrangement for an optical axis adjustment method according to a second embodiment of the invention, in which the method is applied to a light transmission path 1 that includes an optical fiber array and a flat plate waveguide. Connecting such arrays is a common practice. In FIG. 16, reference numeral 15 denotes an optical fiber array and numeral 16 a flat plate optical waveguide. Reference numerical symbol 6A denotes an optical power meter that measures the intensity of light transmitted through the optical waveguide and passes the result to the adjustment apparatus 5 as an evaluation signal 3. Reference numeral 9 denotes an optical switch, which is described below. Configuration elements that are the same as those of the first embodiment have been given the same reference numerals and symbols. In this embodiment, in accordance with a genetic algorithm, the adjustment apparatus 5 uses the positioning apparatus 4 to adjust the optical axes of the optical fiber array 15 to maximize the evaluation value of light transmitted through the light transmission path.

With respect to the axial coordinate values of the optical fiber array 15, there are six degrees of freedom, which are the displacements x, y and z on the X axis, Y axis and Z axis of an orthogonal coordinate system, the rotational amount $\theta x$ about the X axis, the rotational amount $\theta y$ about the Y axis, and the rotational amount $\theta z$ about the Z axis. As in the first embodiment, a one-to-one correspondence is effected between the axial coordinate values and the gene data of the genetic algorithm. That is, as in the example of FIG. 9, when the coordinate values of the optical axis are (x, y, z, $\theta x$, $\theta y$, $\theta z$), the chromosomes of the genetic algorithm are denoted in terms of the displacement ($\Delta x$, $\Delta y$, $\Delta z$, $\Delta\theta x$, $\Delta\theta y$, $\Delta\theta z$) from reference position (x0, y0, z0, $\theta x0$, $\theta y0$, $\theta z0$).

In this embodiment, the sum of the intensities of the light transmitted through the optical axes at each end of the optical waveguide is used as the evaluation value of the light transmitted through the light transmission path. When more precise adjustment of optical axes is desired, the sum of the intensities of the light transmitted through all of the array axes maybe used as the evaluation value.

Basically, the axial adjustment method of this embodiment is the same as that of the first embodiment. Following the setting up of the light transmission path 1, in the adjustment step, a light source 7, adjustment apparatus 5, precision positioning apparatus 4 and optical power meter 6A are positioned as shown in FIG. 16, and axial adjustment is carried out in accordance with the flowcharts of FIGS. 6 and 10. A mirror-based optical switch 9 is provided on the light transmission path 1. When the optical switch 9 is operated, light output from the flat plate waveguide 16 is input to the optical power meter 6A and the adjustment apparatus 5 is started. After completion of the adjustment, the optical switch 9 is operated to switch the output of the light transmission path 1 back to the original output side.

In addition to being utilized for axial adjustment after the light transmission path 1 is set up, a user can also use the optical switch 9 to perform optical axis adjustment of any optical component purchased and incorporated into the light transmission path 1 by the user. This makes it possible to compensate for changes such as when the optical components are transported or when there is a change in the temperature or other conditions of the system environment.

In accordance with the method of this embodiment, a genetic algorithm based search is used to find the axial coordinates of the optical fiber array 10 at which the sum of the intensities of the light passing through the optical axes at each end of the waveguide is at its maximum. This enables the adjustment to be performed speedily and automatically without requiring precision manual adjustment by a skilled technician and without the search process being trapped at local peaks; In terms of the production of the optical components of the light transmission path 1, the result is a major improvement in workability and productivity.

Figure 17:
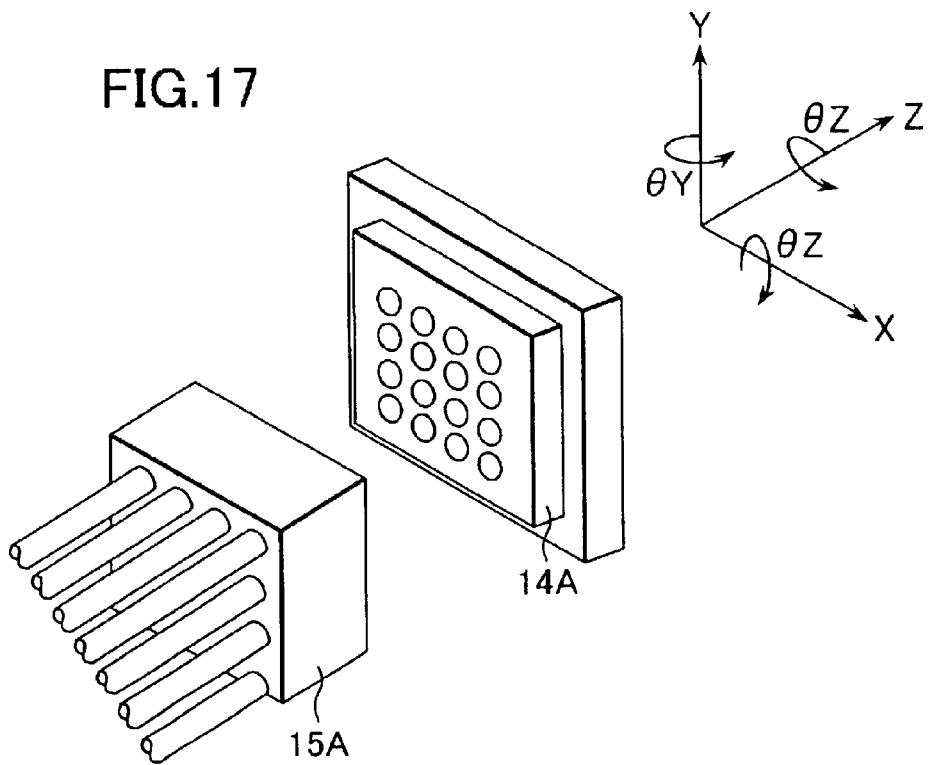
FIG. 17 is an explanatory view showing a two-dimensional fiber array to which the second embodiment can be applied.

While this embodiment is used to adjust a flat plate optical fiber array and a flat plate optical waveguide array, the method can also be applied to the axial adjustment of the type of system shown in FIG. 17, comprising a two-dimensional fiber array 15A and a two-dimensional lens array 14A in a free-space optical system.

Figure 18:
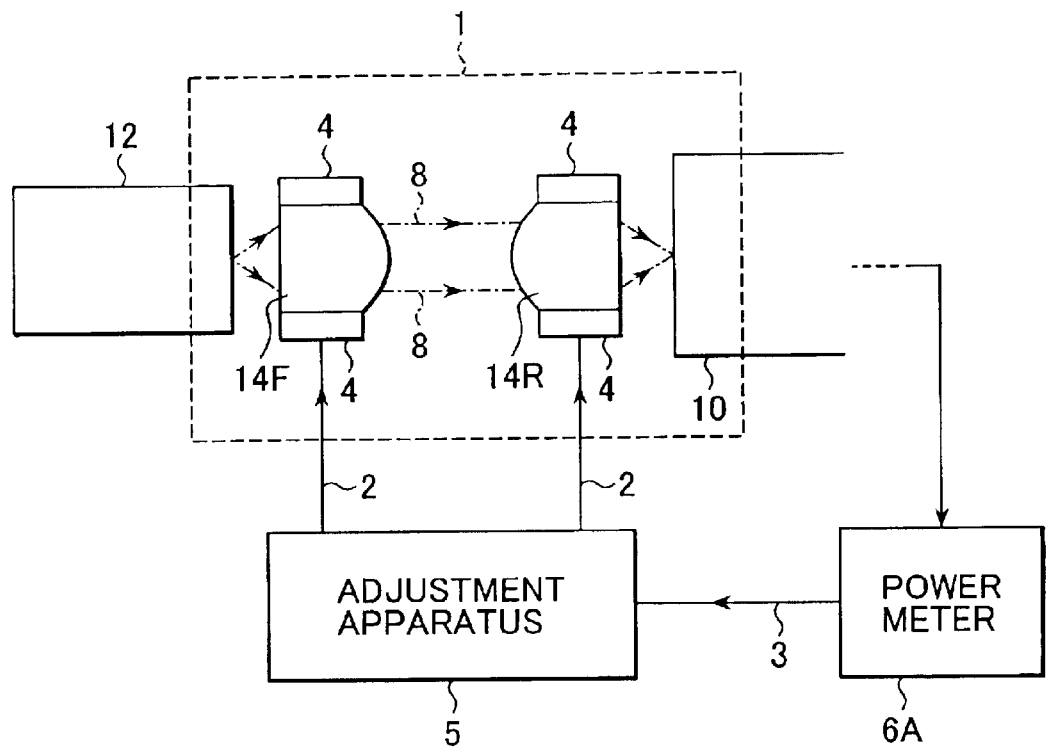
FIG. 18 is a structural diagram of an optical axis adjustment method according to a third embodiment of the present invention.

FIG. 18 shows a configuration used for an optical axis adjustment method according to a third embodiment of the invention, in which the light transmission path 1 to be adjusted includes a light-emitting element, lenses and optical fibers. This type of optical module integrating a plurality of components is used extensively. In FIG. 18, reference numeral 12 denotes a light-emitting element and numerical symbols 14F and 14R denote lenses. The optical power meter 6A measures the intensity of light transmitted through the optical fiber 10 and passes the result to the adjustment apparatus 5 as an evaluation signal 3. Configuration elements that are the same as the elements of the first embodiment have been given the same reference numerals and symbols. In this embodiment, in accordance with a genetic algorithm, the adjustment apparatus 5 uses the positioning apparatus 4 to optimize the optical axes of the two lenses to maximize the evaluation value of light transmitted through the light transmission path.

With respect to the axial coordinate values of the lenses, there are five degrees of freedom, which are the displacements x, y and z on the X axis, Y axis and Z axis respectively of an orthogonal coordinate system, the rotational amount $\theta x$ around the X axis and the rotational amount $\theta y$ around the Y axis. Since there are two independent lenses, there are a total of ten degrees of freedom. As in the first embodiment, a one-to-one correspondence is effected between the axial coordinate values and the gene data of the genetic algorithm. That is, as in the example of FIG. 9, for optical axis coordinate values (xf, yf, zf, $\theta xf$, $\theta yf$, xr, yr, zr, $\theta xr$, $\theta yr$), the chromosomes of the genetic algorithm are denoted in terms of the displacement ($\Delta xf$, $\Delta yf$, $\Delta zf$, $\Delta\theta xf$, $\Delta\theta y$, $\Delta xr$, $\Delta yr$, $\Delta zr$, $\Delta\theta xr$, $\Delta\theta yr$) from reference position (xf0, yf0, zf0, $\theta xf0$, $\theta yf0$, xr0, yr0, zr0, $\theta xr0$, $\theta yr0$).

A finely positioning mechanism that uses a piezoelectric element, or a positioning mechanism using micro-machining technology, can be used for the precision positioning apparatus 4. The light-emitting element 12 can be a semiconductor laser or LED or the like. The intensity of the light transmitted through the optical fiber 10 is used directly as the evaluation value for light transmitted through the light transmission path.

The axial adjustment method of this embodiment is basically the same as that of the first embodiment. Following the setting up of the light transmission path 1, in the adjustment step, the adjustment apparatus 5 and optical power meter 6A are positioned as shown in FIG. 18, and axial adjustment is carried out in accordance with the flowcharts of FIGS. 6 and 10. In this embodiment, the genetic algorithm is used for a search to find the axial coordinates of the two lenses 14F and 14R that maximize the evaluation value of light transmitted through the optical fiber 10. This enables the adjustment of the optical axis with multiple degrees of freedom to be performed speedily and automatically without requiring precision manual adjustment by a skilled technician and without the search process being trapped at local peaks. In terms of the production of the optical modules, the result is a major improvement in workability and productivity.

Although this embodiment has been described with reference to the adjustment of the optical axes of lenses, it is equally applicable with respect to a configuration in which distributed refractive index components are used instead of lenses.

Figure 19:
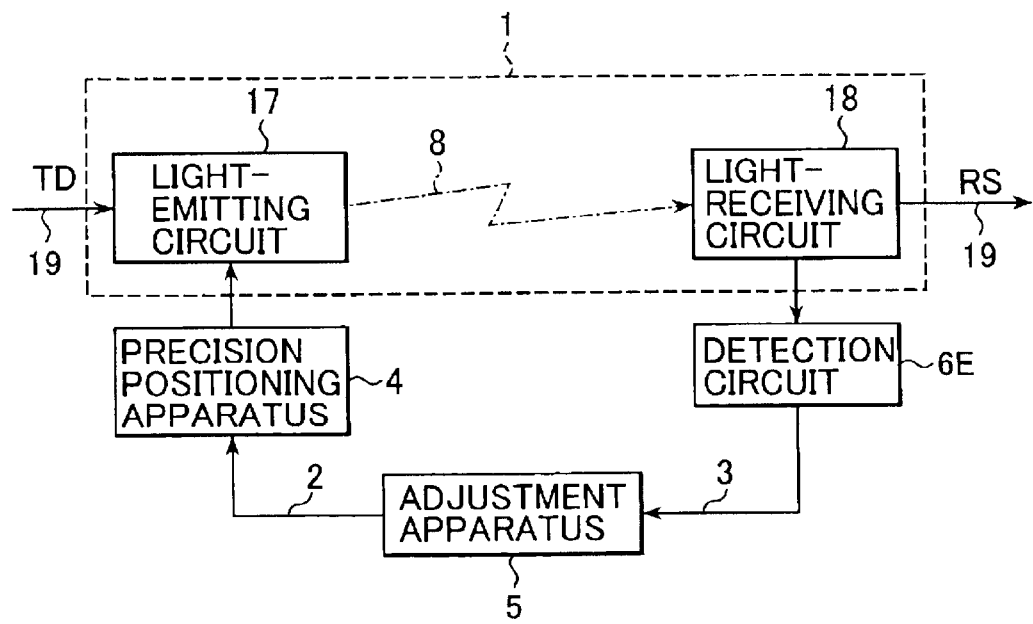
FIG. 19 is a structural diagram of an optical axis adjustment method according to a fourth embodiment of the present invention.

FIG. 19 shows a configuration used for an optical axis adjustment method according to a fourth embodiment of the invention, in which the light transmission path 1 to be adjusted includes a light-emitting circuit, a light-receiving circuit, and a path on which a laser beam is transmitted across an air gap. In FIG. 19, reference numeral 17 denotes a light-emitting circuit 17, numeral 18 a light-receiving circuit, and numeral 8 a laser beam (transmission light) that transmits a light signal from the light-emitting circuit 17 to the light-receiving circuit 18 through air. The light-emitting circuit 17 converts transmission data TD from an electrical signal to a light signal (transmission light 8), with the projection position and attitude being determined by the positioning apparatus 4. The light-receiving circuit 18 converts the light signal (transmission light 8) to an electrical signal for output as received data RD. A received-intensity detection circuit 6E detects the maximum amplitude of the electrical signal waveform from the light-receiving circuit 18, and passes the result to the adjustment apparatus 5 as an evaluation signal 3. Configuration elements that are the same as the elements of the first embodiment have been given the same reference numerals and symbols. In this embodiment, in accordance with the genetic algorithm, the optical axis at the projection position of the light-emitting circuit 17 is optimized by the adjustment apparatus 5 by using the positioning apparatus 4 to maximize the evaluation value from the received-intensity detection circuit 6E.

With respect to the axial coordinate values of the light-emitting circuit 17, there are five degrees of freedom, which are the displacements x, y and z on the X axis, Y axis and Z axis respectively of an orthogonal coordinate system, the rotational amount $\theta x$ about the X axis and the rotational amount $\theta y$ about the Y axis. As in the first embodiment, a one-to-one correspondence is effected between the axial coordinate values and the gene data of the genetic algorithm. Thus, for the axial coordinate values (x, y, z, $\theta x$, $\theta y$), the chromosomes of the genetic algorithm are denoted in terms of the displacement ($\Delta x$, $\Delta y$, $\Delta z$, $\Delta\theta x$, $\Delta\theta y$) from reference position (x0, y0, z0, $\theta x0$, $\theta y0$).

The output of the received-intensity detection circuit 6E is used directly as the evaluation value for light transmitted through the light transmission path. The axial adjustment method of this embodiment is basically the same as that of the first embodiment. Following the setting up of the light transmission path 1, in the adjustment step, the positioning apparatus 4, adjustment apparatus 5 and detection circuit 6E are positioned as shown in FIG. 19, and axial adjustment is carried out in accordance with the flowcharts of FIGS. 6 and 10.

In this embodiment, the genetic algorithm is used to search for the axial coordinates of the light-emitting circuit 17 at which the received-light intensity of the light-receiving circuit 18 is at a maximum. This enables the adjustment to be performed speedily and automatically without requiring precision manual adjustment by a skilled technician and without the search process being trapped at local peaks. In terms of the production of the optical modules, the result is a major improvement in workability and productivity.

The method of this embodiment has the additional advantage of enabling the system apparatus to be made more compact such as if a signal transmission apparatus or the like is used between a mounting head unit and a fixed unit in an apparatus such as an apparatus used for mounting electronic parts. For simplicity, the. explanation of the embodiment has been made with reference to a configuration in which the laser beam transmission is one-way. However, it is to be understood that it can be applied to two-way transmission using a configuration in which each side has both a light-emitting circuit 17 and a light-receiving circuit 18. Moreover, while the embodiment has been described with reference to a laser beam that is transmitted directly from the light-emitting circuit 17 to the light-receiving circuit 18, transmission can instead be effected via a plurality of fixed mirrors.

Figure 20:
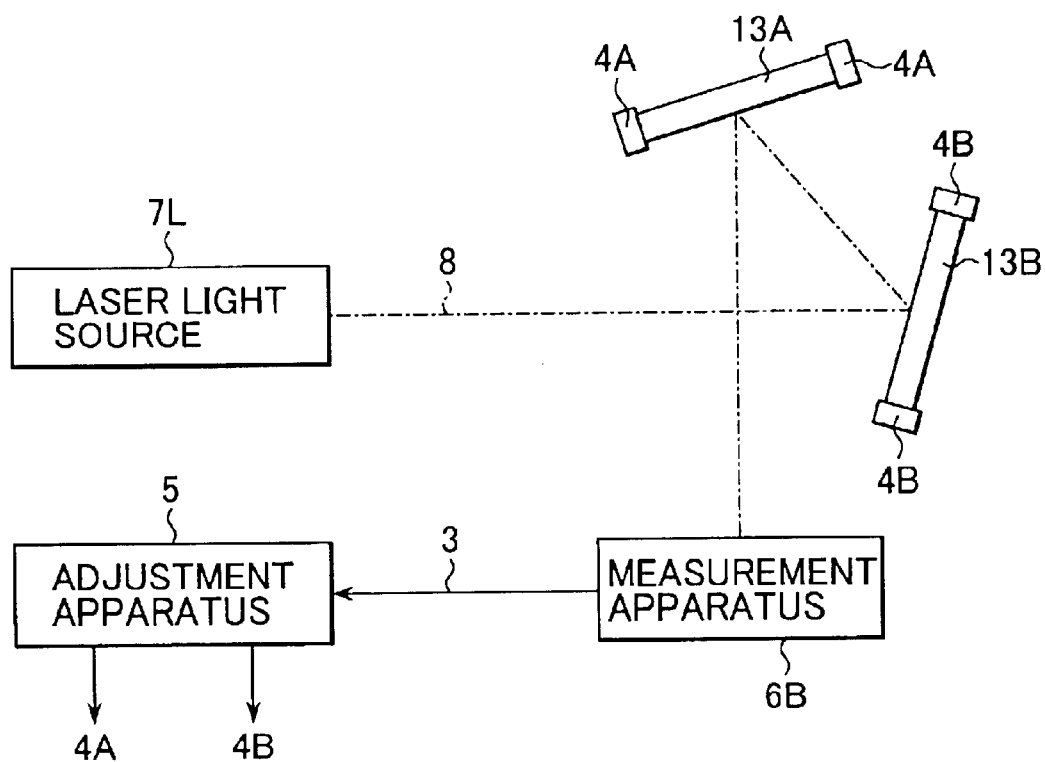
FIG. 20 is a structural diagram of an optical axis adjustment method according to a fifth embodiment of the present invention.

FIG. 20 shows a configuration used for an optical axis adjustment method according to a fifth embodiment of the present invention having a path along which a laser beam is transmitted through air to impinge on a target object. The light transmission path 1 to be adjusted includes a plurality of movable mirrors. In this case, the object of the axial adjustment is for the laser beam to be projected as close as possible to the target point. In FIG. 20, reference numerical symbol 7L denotes a laser light source and numeral 8 the laser beam. Reference numerical symbols 13A and 13B denote auto-adjusting mirrors, and mirror fine-adjustment means 4A and 4B are used for fine adjustment of the optical axes. Deviation of the beam 8 (transmitted via the auto-adjusting mirrors) from the target point is measured by a beam-deviation measurement apparatus 6B, which sends the result of the measurement in the form of an evaluation signal 3 to the adjustment apparatus 5. Configuration elements that are the same as those in the first embodiment have been given the same reference numerals and symbols. In this embodiment, in accordance with the genetic algorithm, the optical axes of the auto-adjusting mirrors 13A and 13B are optimized by the adjustment apparatus 5 by using the mirror fine-adjustment means 4A and. 4B to minimize beam deviation.

With respect to the axial coordinate values of the auto-adjusting mirrors, each mirror has five degrees of freedom, which are the displacements x, y and z on the X axis, Y axis and Z axis respectively in an orthogonal coordinate system, the rotational amount $\theta x$ about the X axis and the rotational amount $\theta y$ about the Y axis. This means a total of ten degrees of freedom for the two mirrors 13A and 13B. As the gene data, the chromosomes of the genetic algorithm are denoted in terms of the coordinate values of the two axes. The displacements of the axes can have a mutually dependent relationship instead of being independent of each other. It is very difficult and time-consuming to design the mechanisms of the auto-adjusting mirrors and mirror fine-adjustment means in the case of independent displacements, and such systems also cost more to manufacture, since parts having high rigidity are used. However, in accordance with the present invention, genetic algorithm based adjustment can still be effected even if the displacements are interdependent, making it possible to reduce design time and lower the manufacturing cost.

A drive mechanism that uses piezoelectric elements or galvanometers can be used for the mirror fine-adjustment means 4A and 4B. For the beam-deviation measurement apparatus 6B, there can be used a position sensitive detector (PSD), a light position detector element that uses a split-type photodiode element, or an apparatus that uses a CCD camera to acquire images that are processed to calculate the deviation from the target projection point.

In this embodiment, the deviation amount output by the beam-deviation measurement apparatus 6B is used directly as an evaluation value for light transmitted through the light transmission path. If, for example, the beam-deviation measurement apparatus 6B outputs a measured deviation of 8.9 mm, the evaluation value will be 8.9. The search problem in this case is one of minimization, since the smaller the evaluation value is, the better.

The axial adjustment method of this embodiment is basically the same as that of the first embodiment. After the light transmission path 1 is set up, in the adjustment step, the adjustment apparatus 5 and beam-deviation measurement apparatus 6B are positioned as shown in FIG. 20, and axial adjustment is carried out in accordance with the flowcharts of FIGS. 6 and 10. In this embodiment, the genetic algorithm is used to search for the axial coordinates of the auto-adjusting mirrors 13A and 13B that provide minimum deviation of the laser beam from the target point. This enables the adjustment to be performed speedily and automatically without requiring precision manual adjustment by a skilled technician and without the search process being trapped at local peaks. Even in an environment in which radiation or high temperatures or the like make it impossible for a human to come close to the light transmission path 1, or in cases where the adjustment must be carried out from a remote location, the adjustment can be done automatically, which means a great improvement in workability in the light transmission path setup phase.

Adjustment can also be carried out avoiding local evaluation function peaks even when large mirrors are used and of mirror axes is not independent. Moreover, when axial deviation arises during adjustment as a result of extraneous mechanical noise and vibration, air fluctuations and so forth, because the genetic algorithm search method does not use gradients and is a multi-point search method, it can provide effective searches. That is, with ordinary search methods that utilize gradients, noise produces major changes in gradient values, and because they are not multi-point searches, searches go off in an erroneous direction that makes convergence impossible. In contrast, because a genetic algorithm based search does not use gradients, searches do not readily go off in erroneous directions. Moreover, since the genetic algorithm based search is a multi-point search, even if noise should cause a temporary worsening in individual evaluation values, the fact that there is a plurality of individual evaluation values, in terms of the overall population set, causes the search to move toward convergence.

In the first to fifth embodiments described in the foregoing, the genetic algorithm is used as a probabilistic search technique. However, in the genetic algorithm, with respect to the fitness, meaning the evaluation function F that expresses how close to the ideal values the optical axial coordinate values are, when there is a small number of local optimal solutions (generally a single-digit number), the simulated annealing method algorithm can be used instead of the genetic algorithm. In addition, even in cases in which there are a large number of local optimal solutions, more rapid searches are possible although the performance obtained as a result of the adjustment is lower, compared to the genetic algorithm. For details of the simulated annealing method, see "Simulated Annealing and Boltzmann Machines," by E. Aarts and J. Korst, published in 1989 by John Wiley & Sons, for example. Simulated annealing is a type of hill-climbing algorithm improved by using a control parameter called temperature to prevent a search from being misled to local optimal solutions.

Figure 6:
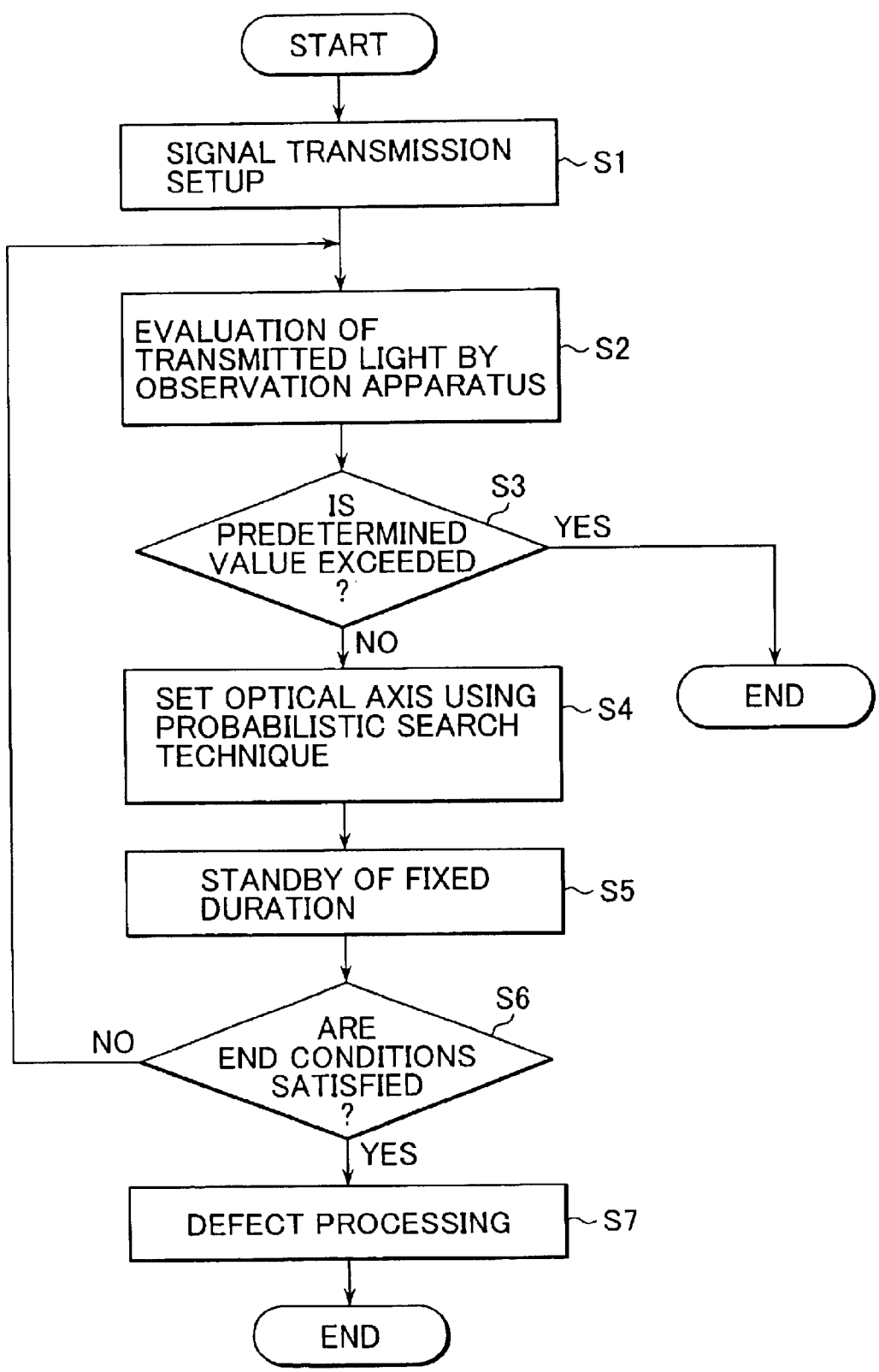
FIG. 6 is a flowchart showing an overview of the processing sequence in the optical axis adjustment method according to the first embodiment of the invention.
Figure 21:
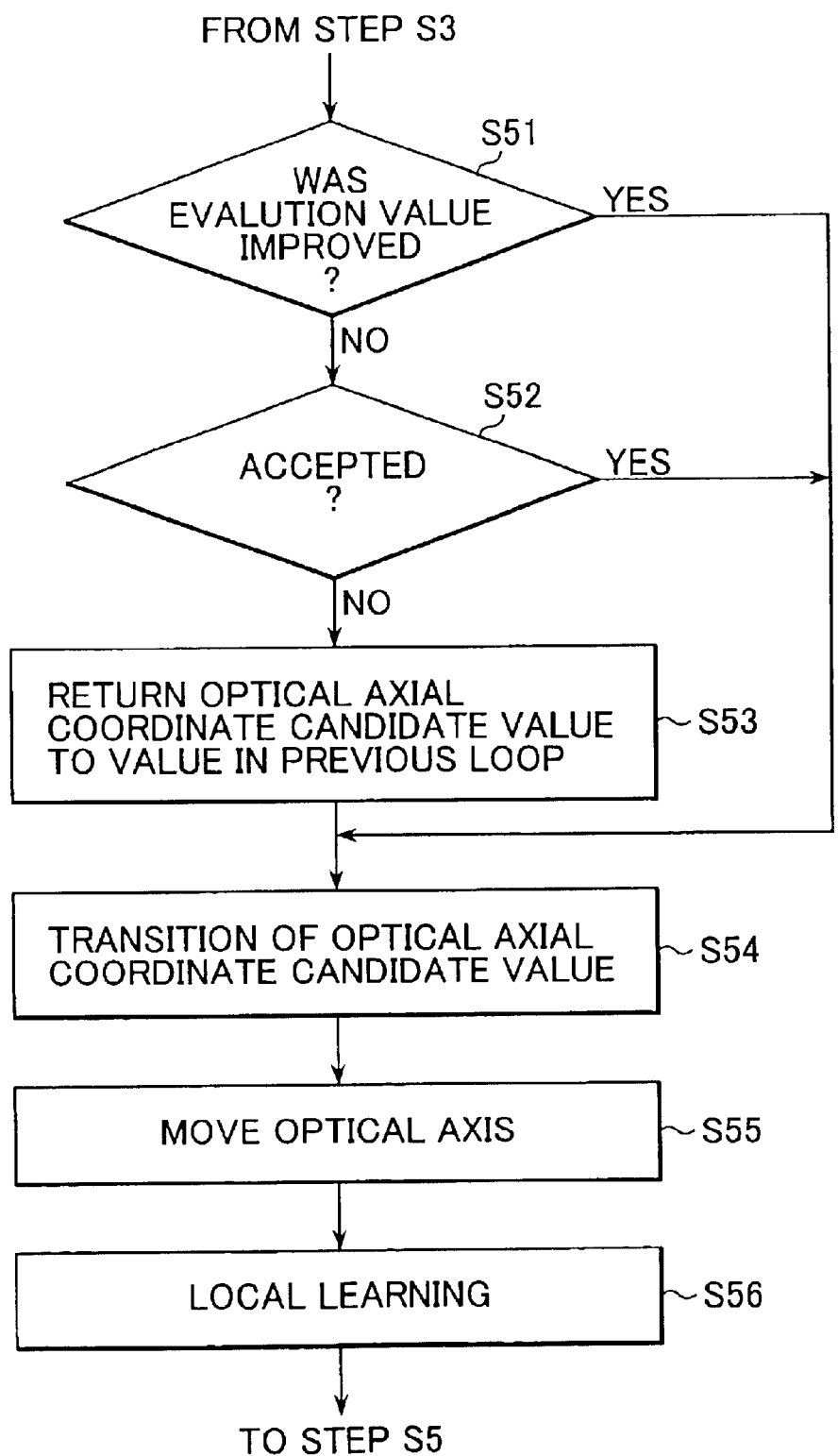
FIG. 21 is a flowchart showing the process sequence of the simulated annealing method used in an optical axis adjustment method according to a sixth embodiment of the present invention.

An optical axis adjustment method according to a sixth embodiment of the present invention is described below, with reference to the flowcharts of FIGS. 6 and 21. In this embodiment, which has the same type of configuration as the first embodiment, the adjustment apparatus 5 is used to change the axial coordinate values in accordance with the simulated annealing method. Here too, as the evaluation function F that expresses how close to the ideal solution the solution candidates are, there is used a function that expresses the received-light intensity observed by means of the detector 6C. With the evaluation value of the detector 6C in step S2 being taken directly as the value of evaluation function F, in step S3 the adjustment apparatus, 5 determines whether or not the evaluation function F value exceeds the target value. If the target is not exceeded, in step S51 (FIG. 21), this evaluation function value is compared, to the evaluation function value from the previous loop to determine whether or not the value has been improved.

If the value has been improved, the axial coordinate values at that time are taken as the next axial coordinate candidate values and the process moves to step S54, where a portion of these candidate values are changed by a transition operation. For the transition in the simulated annealing method of this embodiment, the method used is the same as that used in the mutation method in the genetic algorithm explained with reference to FIG. 12. If the value has not been improved, in step S52 a value is calculated for a acceptance function that has a value domain of from not less than 0 to not more than 1. This function value is compared against the real-number value of a uniform random number generated in the 0 to 1 range. If the random-number value is smaller, it is deemed that the transition result has been accepted, and the process moves on to step S54. In this case, the search is temporarily performed in the direction in which the evaluation function worsens. If the random-number value is greater than the acceptance function value, in step S53 the candidate register value is returned to the register value in the previous loop and the process advances to step S54.

The acceptance function value in loop k is expressed in equation (1) below, in which F(k−1) is the value of the evaluation function in the previous loop, F(k) is the value of the evaluation function in the current loop, and T(k) is the parameter temperature.

$$\exp\left(\frac{F(k) - F(k-1)}{T(k)}\right) \qquad (1)$$

The higher the temperature T(k), the closer to 1 the value of the reception function becomes. This means that the higher the temperature becomes, the further the search will advance in the worsening direction of the evaluation function. This is done to prevent the search from being misled to local optimal solutions. Thus, by setting a high temperature in the initial stage of the search and gradually lowering the temperature as the search advances, it can be expected that the true optimal solution will ultimately be reached. This is what simulated annealing is. The simulated annealing method can be used to perform a more efficient search than the genetic algorithm in cases in which the optical axis has a small number of degrees of freedom and, accordingly, not many local optimal solutions. However, in cases where the evaluation function F does have a large number of local optimal solutions, in a practical search time the search will be trapped in a local optimal solution, rendering the performance inferior to that of the genetic algorithm. However, one advantage it does have is that it can shorten the time required until convergence.

Then, in step S55, the changing of the axial coordinate values is initiated, and in step S56, the local learning process is performed as used in the genetic algorithm described with reference to FIG. 13. The axial adjustment of the optical fiber 10 is performed by repeating the above operations until a high evaluation function value is obtained signifying a satisfactory received-light intensity. If a satisfactory solution has not been obtained after a set number of repetitions have been performed or repetitions have been performed for a set period of time, the light transmission path is deemed to be defective, and processed as such in step S7.

The temperature is varied according to the following equation (2), for example.

$$T(k)=0.1/(k+1) \qquad (2)$$

Although the simulated annealing method enables the optical axes to be adjusted rapidly, the performance obtained is not as good as that obtained using the genetic algorithm. While this embodiment has been explained with reference to the light transmission path of the first embodiment, it is to be understood that the light transmission path may be a general one as shown in the second to fifth embodiments, with respect to which, again, adjustment can be performed rapidly although with a resultant performance that is inferior to that obtained using a genetic algorithm.

It is to be understood that the present invention can be applied to the overall or partial light transmission path containing a plurality of optical components, as well as to any of the plurality of components, regardless of the scale of the light transmission path, to the extent from which the scope of the invention does not depart. For example, the invention can be applied to optical axis adjustment between semiconductor lasers, mirrors and light-receiving elements in an optical lever type optical system that employs measurement of the displacement of an object.

The foregoing is an explanation based on illustrated embodiments, but the invention is in no way limited to the aforementioned embodiments, but within the scope of the invention claimed herein also includes other modifications readily accomplished by those skilled in the art.

What is claimed is:

1. A method for adjusting an optical axis of a light transmission path that includes a plurality of optical components, comprising:

sequentially adjusting an optical axis of a designated single optical component, or multiple optical components, among said plurality of optical components in accordance with a probabilistic search technique;

measuring optical axial coordinate values while sequentially adjusting said optical axis to produce a plurality of measured optical axial coordinate values;

evaluating an intensity of light transmitted through said light transmission path at a time of measurement to produce a plurality of evaluation values;

storing in a memory a plurality of value pairs, each of said plurality of value pairs including a measured optical axial coordinate value and a corresponding evaluation value; and replacing a solution candidate of the probabilistic search technique with a value pair having a largest evaluation value.

2. The method according to claim 1, wherein said step of sequentially adjusting further comprises:

sequentially adjusting the optical axis in accordance with a genetic algorithm.

3. The method according to claim 1, wherein said step of sequentially adjusting further comprises:

searching for an optimum evaluation value in accordance with a hill-climbing method.

4. The method according to claim 1, wherein said step of sequentially adjusting further comprises:

searching for an optimum value by sequentially adjusting the optical axis in accordance with a simulated annealing method.

5. The method according to claim 1, wherein said step of sequentially adjusting further comprises:

evaluating an intensity of light transmitted through the light transmission path.

6. The method according to claim 1, wherein said plurality of optical components comprises:

an optical fiber.

7. The method according to claim 1, wherein said plurality of optical components include comprises:

an optical fiber array.

8. The method according to claim 1, wherein said plurality of optical components comprises:

a lens.

9. The method according to claim 1, wherein said plurality of optical components comprises:

a light-emitting element.

10. The method according to claim 1, wherein said plurality of optical components comprises:

a light-receiving element.

11. The method according to claim 1, wherein said plurality of optical components comprises:

an optical waveguide.

12. The method according to claim 1, wherein said plurality of optical components comprises:

a mirror.

13. The method according to claim 1, aid step of sequentially adjusting further comprises:

sequentially adjusting an optical axis with an electronic computer and a recording medium that can be read by said electronic computer.

14. The method according to claim 13, wherein said sequentially adjusting an optical axis with an electronic computer and a recording medium comprises:

exulting an adjustment program that includes a probabilistic search technique configured to search for an optical axis of one or a plurality of optical components so as to provide an optimum evaluation value with respect to light transmitted through the light transmission path.

15. A method for adjusting an optical axis of a light transmission path that includes a plurality of optical components, comprising:

sequentially adjusting an optical axis of a designated single optical component, or multiple optical components, among said plurality of optical components in accordance with a probabilistic search technique; and evaluating a positional deviation of light transmitted through said light transmission path with respect to a target light irradiation position while sequentially adjusting said optical axis so as to create an evaluation value.

16. A method according to claim 15, wherein said step of sequentially adjusting further comprises:

sequentially adjusting the optical axis in accordance with a genetic algorithm.

17. The method according to claim 15, wherein said step of sequentially adjusting further comprises:

searching for an optimum evaluation value in accordance with a hill-climbing method.

18. The method according to claim 15, wherein said step of sequentially adjusting further comprises:

sequentially adjusting the optical axis in accordance with a simulated annealing method.

19. The method according to claim 15, wherein said step of sequentially adjusting further comprises:

measuring optical axial coordinate values while sequentially adjusting said optical axis to produce a plurality of measured optical axial coordinate values;

storing in a memory a plurality of value pairs, each of said plurality of value pairs including a measured optical axial coordinate value and a corresponding evaluation value; and selecting a value pair having a largest evaluation value as a local optimum solution.

20. The method according to claim 15, wherein said plurality of optical components comprises:

a mirror.

21. The method according to claim 15, wherein said said step of sequentially adjusting further comprises:

sequentially adjusting with an electronic computer and a recording medium that can be read by said electronic computer.

22. The method according to claim 21, wherein said sequentially adjusting with an electronic computer and a recording medium comprises:

executing an adjustment program that includes a probabilistic search technique configured to search for an optical axis of one or a plurality of optical components so as to provide an optimum evaluation value with respect to light transmitted through the light transmission path.

23. An apparatus configured to adjust an optical axis of a light transmission path that includes a plurality of optical components, comprising:

means for sequentially adjusting an optical axis of a designated single optical component, or multiple optical components, among said plurality of optical components in accordance with a probabilistic search technique;

means for measuring optical axial coordinate values while sequentially adjusting said optical axis to produce a plurality of measured optical axial coordinate values;

means for evaluating an intensity of light transmitted through said light transmission path at a time of measurement so as to produce a plurality of evaluation values;

means for storing in a memory a plurality of value pairs, each of said plurality of value pairs including a measured optical axial coordinate value and a corresponding evaluation value; and means for replacing a solution candidate of the probabilistic search technique with a value pair having a largest evaluation value.

24. An apparatus configured to adjust an optical axis of a light transmission path that includes a plurality of optical components, comprising:

means for sequentially adjusting an optical axis of a designated single optical component, or multiple optical components, among said plurality of optical components in accordance with a probabilistic search technique; and means for evaluating a positional deviation of light transmitted through said light transmission path with respect to a target light irradiation position while sequentially adjusting said optical axis so as to produce an evaluation value.

25. An apparatus configured to adjust an optical axis of a light transmission path that includes a plurality of optical components, comprising:

an adjuster configured to sequentially adjust an optical axis of a designated single optical component, or multiple optical components, among said plurality of optical components in accordance with a probabilistic search technique;

a measurer configured to measure optical axial coordinate values while said adjuster sequentially adjusts said optical axis and to produce a plurality of measured optical axial coordinate values;

an evaluator configured to evaluate an intensity of light transmitted through said light transmission path at a time of measurement and to produce a plurality of evaluation values;

a memory configured to store a plurality of value pairs, each of said plurality of value pairs including a measured optical axial coordinate value and a corresponding evaluation value; and an updater configured to replace a solution candidate of the probabilistic search technique with a value pair having a largest evaluation value.

26. An apparatus configured to adjust an optical axis of a light transmission path that includes a plurality of optical components, comprising:

an adjuster configured to sequentially adjust an optical axis of a designated single optical component, or multiple optical components, among said plurality of optical components in accordance with a probabilistic search technique; and evaluator configured to evaluate a positional deviation of light transmitted through said light transmission path with respect to a target light irradiation position while said adjuster sequentially adjusts said optical axis and to produce an evaluation value.

* * * * *